(12) United States Patent
Castell

(10) Patent No.: US 11,098,790 B2
(45) Date of Patent: Aug. 24, 2021

(54) LINEAR ACTUATOR WITH EVERTED BALL SCREW DRIVE

(71) Applicant: AMETEK, INC., Berwyn, PA (US)

(72) Inventor: Daniel William Castell, Broken Arrow, OK (US)

(73) Assignee: AMETEK, INC., Berwyn, PA (US)

( * ) Notice: Subject to any disclaimer, the term of this patent is extended or adjusted under 35 U.S.C. 154(b) by 0 days.

(21) Appl. No.: 16/874,323

(22) Filed: May 14, 2020

(65) Prior Publication Data

US 2020/0362947 A1 Nov. 19, 2020

Related U.S. Application Data

(63) Continuation-in-part of application No. 16/411,322, filed on May 14, 2019.

(51) Int. Cl.
*F16H 25/08* (2006.01)
*F16H 25/22* (2006.01)
*F16H 25/20* (2006.01)

(52) U.S. Cl.
CPC ..... *F16H 25/2228* (2013.01); *F16H 25/2015* (2013.01)

(58) Field of Classification Search
CPC .................. F16H 25/2228; F16H 25/2209
See application file for complete search history.

(56) References Cited

U.S. PATENT DOCUMENTS

| 2,398,789 A | 4/1946 | Hoffar |
| 2,590,745 A * | 3/1952 | Wuensch ............ F16H 25/2228 74/625 |

(Continued)

FOREIGN PATENT DOCUMENTS

| DE | 102015109159 A1 | 12/2015 |
| EP | 3348452 A1 | 7/2018 |

(Continued)

OTHER PUBLICATIONS

International Search Report and Written Opinion for International Application No. PCT/US2020/032955, dated Jul. 17, 2020 (dated Jul. 17, 2020)—12 pages.

(Continued)

*Primary Examiner* — Randell J Krug
(74) *Attorney, Agent, or Firm* — Culhane Meadows PLLC; Stephen J. Weed

(57) ABSTRACT

Linear actuators driven by everted ball screw assemblies are described herein. In some examples, the everted ball screw assembly includes a hollow screw shaft with internal threads, a ball cylinder concentrically positioned therein and having external threads, and a plurality of balls sized to fit in a substantially contiguous series along a working pathway that is defined by the space between the internal and external threads. One or more limiters prevent the ball cylinder from rotating. A motor rotates the hollow screw shaft, thereby driving the balls along the pathway and imparting linear motion to the ball cylinder, which is coupled to a connecting rod for actuating a load. The ball cylinder in some examples includes an internal return path with scoop elements that are sized and shaped to guide the balls into the internal return path and then back onto the working pathway.

11 Claims, 18 Drawing Sheets

(56) References Cited

U.S. PATENT DOCUMENTS

| | | | |
|---|---|---|---|
| 2,975,649 | A | 3/1961 | Propst |
| 3,580,098 | A | 5/1971 | Goad |
| 4,258,584 | A * | 3/1981 | Haegele ............. F16H 25/2228 74/424.85 |
| 4,366,723 | A | 1/1983 | Wilke et al. |
| 5,092,539 | A | 3/1992 | Caero |
| 5,809,838 | A | 9/1998 | Miyaguchi et al. |
| 6,176,149 | B1 | 1/2001 | Misu |
| 6,202,498 | B1 | 3/2001 | Schlenker |
| 8,109,169 | B2 | 2/2012 | Kato et al. |
| 9,027,424 | B2 * | 5/2015 | Flamme .................. H02K 7/06 74/89.32 |
| 2001/0020400 | A1 | 9/2001 | Walton |
| 2004/0093973 | A1 | 5/2004 | Halasy-Wimmer et al. |
| 2012/0240706 | A1 | 9/2012 | Ohkubo et al. |
| 2015/0053036 | A1 | 2/2015 | Chen |
| 2015/0362050 | A1 | 12/2015 | Kuo et al. |
| 2015/0369349 | A1 | 12/2015 | Kuo et al. |
| 2016/0186887 | A1 | 6/2016 | Dubus et al. |
| 2017/0023080 | A1 | 1/2017 | Gerber et al. |

FOREIGN PATENT DOCUMENTS

| | | |
|---|---|---|
| EP | 3348865 A1 | 7/2018 |
| JP | 2006234151 A | 9/2006 |
| WO | 2015081191 A1 | 6/2015 |

OTHER PUBLICATIONS

Jonathan Kasberg, The Fundamentals of Ball Screws, Machine Design, Aug. 2015, pp. 24-27.

U.S. Appl. No. 16/411,322 entitled Everted Ball Screw Drive, filed May 14, 2019 by AMETEK, Inc.

* cited by examiner

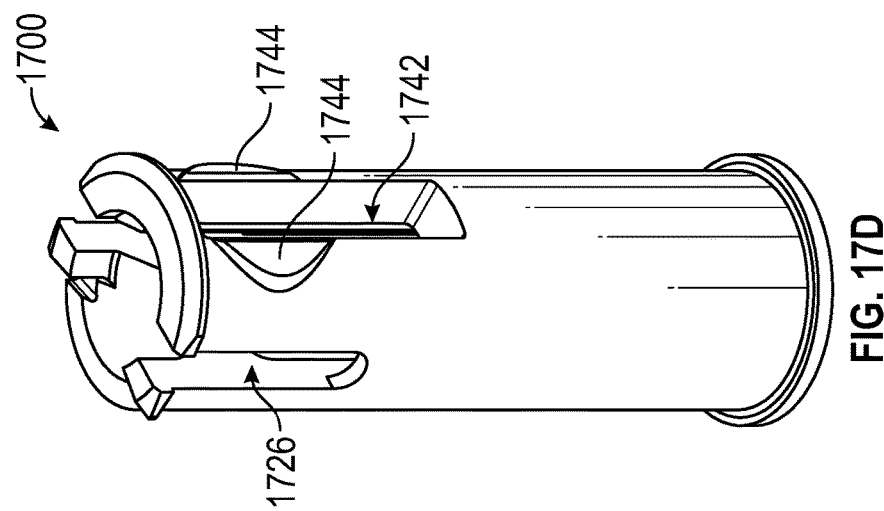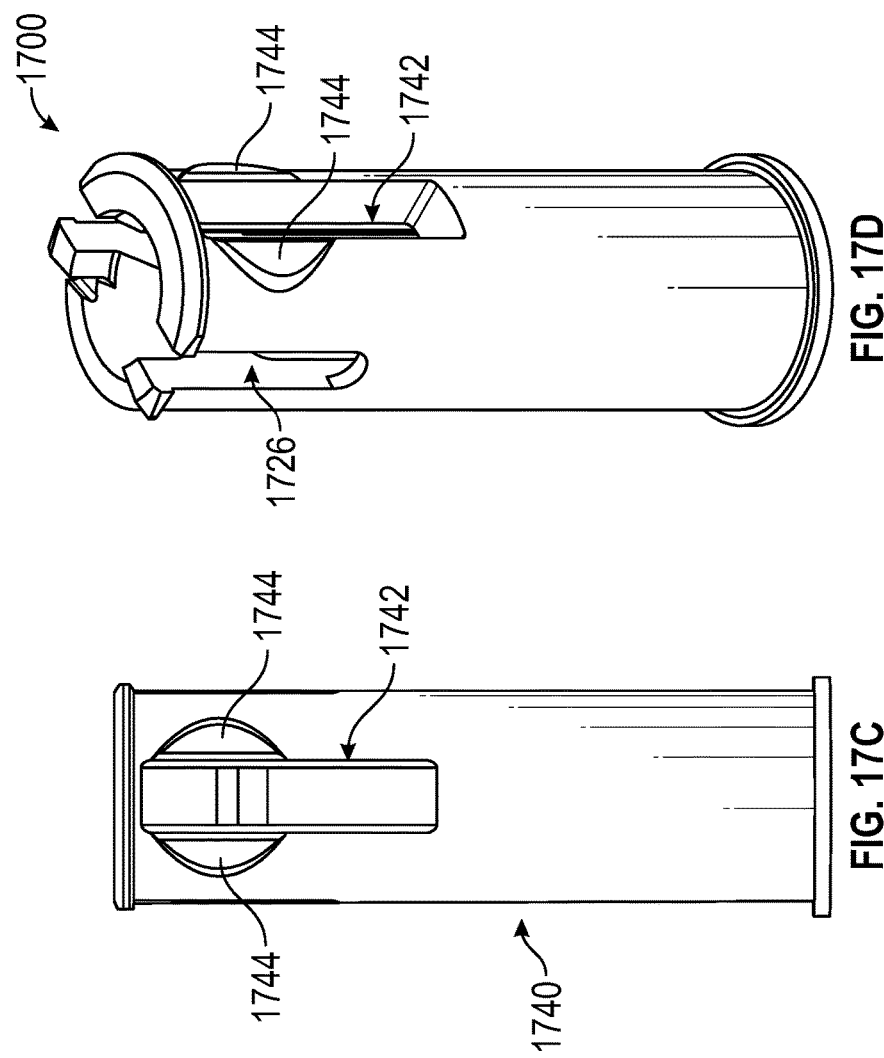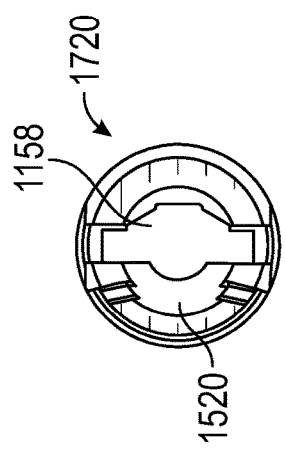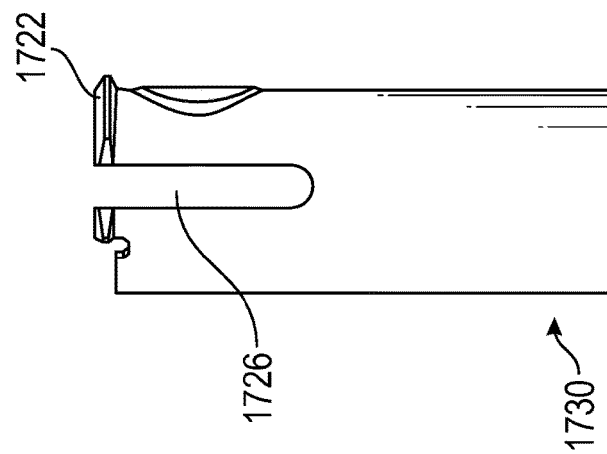

LINEAR ACTUATOR WITH EVERTED BALL SCREW DRIVE

CROSS-REFERENCE TO RELATED APPLICATIONS

The present application is a continuation-in-part of U.S. application Ser. No. 16/411,322 entitled "Everted Ball Screw Drive," filed May 14, 2019, and currently pending, which is incorporated herein by reference in its entirety.

TECHNICAL FIELD

The disclosed subject matter includes examples of everted ball screw drives and, in particular, everted ball screw assemblies for driving linear actuators.

BACKGROUND

A conventional ball screw assembly includes an elongate threaded shaft, a ball nut with matching threads, and a plurality of load-bearing balls that travel along the helical pathway created between the shaft threads and the nut threads. After moving along the helical pathway, the balls travel along a return pathway, in a generally continuous loop. If the shaft is fixed axially, then rotation of the shaft will impart linear motion to the ball nut. If the ball nut is fixed axially, then rotation of the ball nut will impart linear motion to the shaft. In this way, a ball screw converts rotational motion to linear motion with high mechanical efficiency and accuracy. Ball screws are used, for example, to drive linear actuators that are used in applications that require precise movement, high efficiency, and durability.

A conventional ball screw assembly typically requires a significant amount of space because the assembly is rather large in both diameter and total length. The ball nut is large in diameter because of the space occupied by the return pathway, which can be located inside the nut or externally. The housing is long because space is needed to accommodate the motion of the ball nut through the entire stroke length. A conventional ball screw assembly, for example, may have a total length that is equal to three times the stroke length, plus the ball nut length, plus the thickness of the end plates.

A conventional ball screw assembly has a generally small effective radius because the balls inside the nut travel around and close to the central axis of the threaded shaft. For such a device with a small radius, an eccentric load can generate high forces that can cause buckling, especially for a relatively long shaft such as those needed for a conventional ball screw. Shafts that are bent or warped due to repeated actuation under an eccentric load will also degrade the accuracy of the linear motion. To prevent bending and preserve accuracy, a conventional ball screw under eccentric loading may require additional support structures inside and/or outside the housing.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to-scale unless otherwise indicated. The dimensions of the various elements may be enlarged or reduced in the interest of clarity. The several figures depict one or more implementations and are presented by way of example only and should not be construed as limiting. Included in the drawings are the following figures:

FIG. 8A is a perspective view of the scoop insert, showing the contoured surfaces of the scoop portion and the ledges on one side of the body portion.

FIG. 8B is a top view of the scoop insert.

FIG. 8C is a perspective view of the scoop insert, showing the contoured surfaces of the scoop portion and the passage through the body portion.

FIG. 8D is a side view of the scoop insert, showing the ledges on one side of the body portion.

FIG. 8E is a side view of the scoop insert, showing the shoulder surfaces around the scoop portion.

FIG. 8F is a sectional view of the scoop insert taken along line 8F-8F of FIG. 8E, showing the ball guide surfaces and the passage through the body portion.

FIG. 17A is a top view of a sensor chamber suitable for use with the ball cylinder of FIG. 11.

FIG. 17B is a view of the front side of the sensor chamber.
FIG. 17C is a view of the right side of the sensor chamber.
FIG. 17D is a perspective view of the sensor chamber.

DETAILED DESCRIPTION

Figure 1:
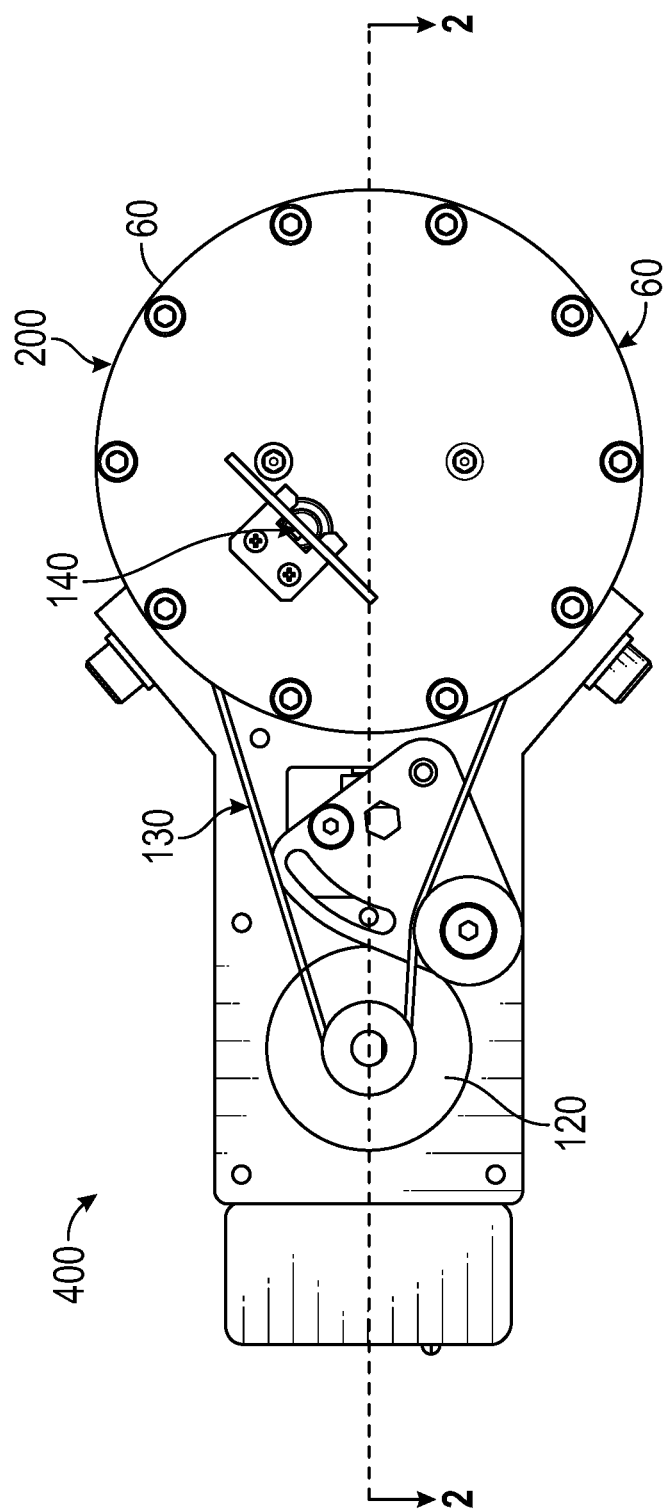
FIG. 1 is a bottom view of a linear actuator assembly, in accordance with some implementations.

The following detailed description includes numerous details and examples that are intended to provide a thorough understanding of the subject matter and its relevant teachings. Those skilled in the relevant art may understand how to apply the relevant teachings without such details. This disclosure is not limited to the specific devices, systems, and methods described because the relevant teachings can be applied or practiced in a variety of ways. The terminology and nomenclature used herein is for the purpose of describing particular aspects only and is not intended to be limiting.

Those skilled in the relevant art will recognize and appreciate that many changes can be made to the various aspects of the implementations described herein, while still obtaining the beneficial results. It will also be apparent that some of the desired benefits can be obtained by selecting some of the features, but not others. Accordingly, those who work in the art will recognize that many modifications and adaptations are possible and may even be desirable in certain applications, and that these are part of the disclosure.

The terms "comprising" and "including," and any forms thereof, are intended to indicate a non-exclusive inclusion; that is, to encompass a list that includes the items listed and may include others not expressly listed. As used herein, the singular forms "a," "an" and "the" include plural referents unless the context clearly dictates otherwise. Thus, for example, reference to a component can include two or more such components unless the context indicates otherwise. Relational terms such as "first" and "second" and the like may be used solely to distinguish one element or action from another, without implying any particular order between such elements or actions.

The terms "optional" or "optionally" mean that the subsequently described element or action may or may not occur. In other words, such a description includes instances where the element or action occurs and instances where it does not.

Then term "facilitate" means to aid, assist, enable, improve, or make easier. The term "inhibit" means to hinder, restrain, impede, restrain, thwart, oppose, or obstruct.

The words "proximal" and "distal" are used to describe items or portions of items that are situated closer to and away from, respectively, a user or a viewer. Thus, for example, the near end or other portion of an item may be referred to as the proximal end, whereas the generally opposing portion or far end may be referred to as the distal end.

Then term "continuous" means consecutive, uninterrupted, ongoing, circulating, or forming a series without exceptions or reversals. The term "contiguous" means touching, abutting, meeting, or sharing a common border.

Then term "inverted" means to arrange one or more elements in a reversed or opposite position. The term "everted" means to arrange elements in an inside-out orientation.

A screw is one of the six classical simple machines. Geometrically, a screw can be thought of as an inclined plane wrapped around a cylinder. A common screw includes a cylindrical shaft with helical ridges and grooves called threads around the exterior surface. Thread depth is the distance between the peak or crest of a thread to the valley or root. The major diameter of an external screw thread is measured from the crest of each thread. The minor diameter is measured from the root of each thread. The pitch of a thread is the distance from one crest to the next. The sides of the valley formed by the threads are called flanks. The pitch diameter refers to the diameter of a cylindrical surface that intersects the thread flanks at equidistant points when viewed in cross section; the distance between these points is exactly half the pitch.

A cylindrical coordinate system is based on a longitudinal axis extending through and lengthwise along the center of the cylinder. Linear motion refers to movement along or parallel to the longitudinal axis. Rotation refers to circular motion of an object around the longitudinal axis. Radial motion refers to movement of an object in a radial direction, either toward or away from the longitudinal axis.

A conventional ball screw actuator typically requires a significant amount of space because the assembly is large in both diameter and total length. For example, the ball screw assembly may have a total length that is equal to three times the stroke length, plus the ball nut length, plus the thickness of the end plates. There is a need in the art for linear actuators that are capable of operating in a small space.

There is also a need for linear actuators that are capable of withstanding a significant eccentric load. Most conventional ball screws have a small effective radius, which means that eccentric loads will generate high forces that can cause buckling of the screw shaft. Thus, there exists a need in the art for linear actuators having a larger effective radius, capable of withstanding eccentric loads without buckling.

Although the various embodiments and implementations are described with reference to a linear actuator driven by an everted ball screw assembly, the systems and methods described herein may be applied to and used with any of a variety of systems, especially those in which high mechanical efficiency, precision, and durability are desired.

A conventional ball screw includes a solid screw shaft (with an external thread) and a ball nut (with an internal thread). The ball screw assemblies, as described herein, are referred to as everted because they include a hollow screw shaft (with an internal thread) and a ball cylinder (instead of a ball nut; with an external thread).

An everted ball screw assembly, according to some example implementations described herein, includes a hollow screw shaft having an internal thread on its interior surface. The assembly may include a support bearing for supporting the hollow screw shaft in a housing. The support bearing may be configured to inhibit linear motion and facilitate rotation of the hollow screw shaft. A ball cylinder with external threads is concentrically disposed inside the hollow screw shaft. The ball cylinder has an external thread that is sized and shaped to oppose the internal thread on the interior surface of the hollow screw shaft. The external thread and internal thread are similar in size and pitch, but they are not in direct contact like a typical nut and bolt. Instead, there is a space between the threads; this space forms a substantially continuous working pathway for a plurality of balls of uniform size. The balls may rest on the sides or flanks of the threads, with sufficient clearance to allow the balls to roll along the working pathway. With the balls positioned between the threads, the hollow screw shaft and the ball cylinder are moveable relative to one another.

The ball cylinder includes an internal return path extending through the body of the ball cylinder, allowing the balls to return to the start of the working pathway. The internal return path and the working pathway, together, define a substantially continuous ball circulation pathway. The diameter of the balls is selected so the balls will fit in a substantially contiguous series when positioned along the ball circulation pathway. The assembly may also include one or more limiters positioned to inhibit rotation and facilitate linear motion of the ball cylinder. With the ball cylinder inhibited in rotation only, any rotation of the hollow screw shaft (by a motor, for example) will drive the balls along the continuous ball circulation pathway, thereby causing the ball cylinder to move in a linear direction inside the hollow screw shaft. In this manner, the rotational motion of the shaft is converted to the linear motion of the ball cylinder.

FIG. 1 is a bottom view of a linear actuator assembly 400 according to some implementations. The linear actuator assembly 400 may include a motor 120 and an everted ball screw assembly 200. The motor 120 drives a belt 130 which is engaged with the everted ball screw assembly 200. Other types of motors and driving assemblies may be used, such as a motor with a worm gear, depending on the needs of a particular application.

The everted ball screw assembly 200 may include a housing with a base plate 60 and a linear position sensor 140. The sensor 140 may include a number of discrete sensor elements positioned along the length of the everted ball screw assembly 200. For example, a magnet may be embedded or otherwise attached to one or more parts, such as the ball cylinder 20 described herein, such that the magnet will trigger one of the sensor elements as it passes. The linear position sensor 140 may be any of a variety of linear-position sensing systems.

Figure 2:
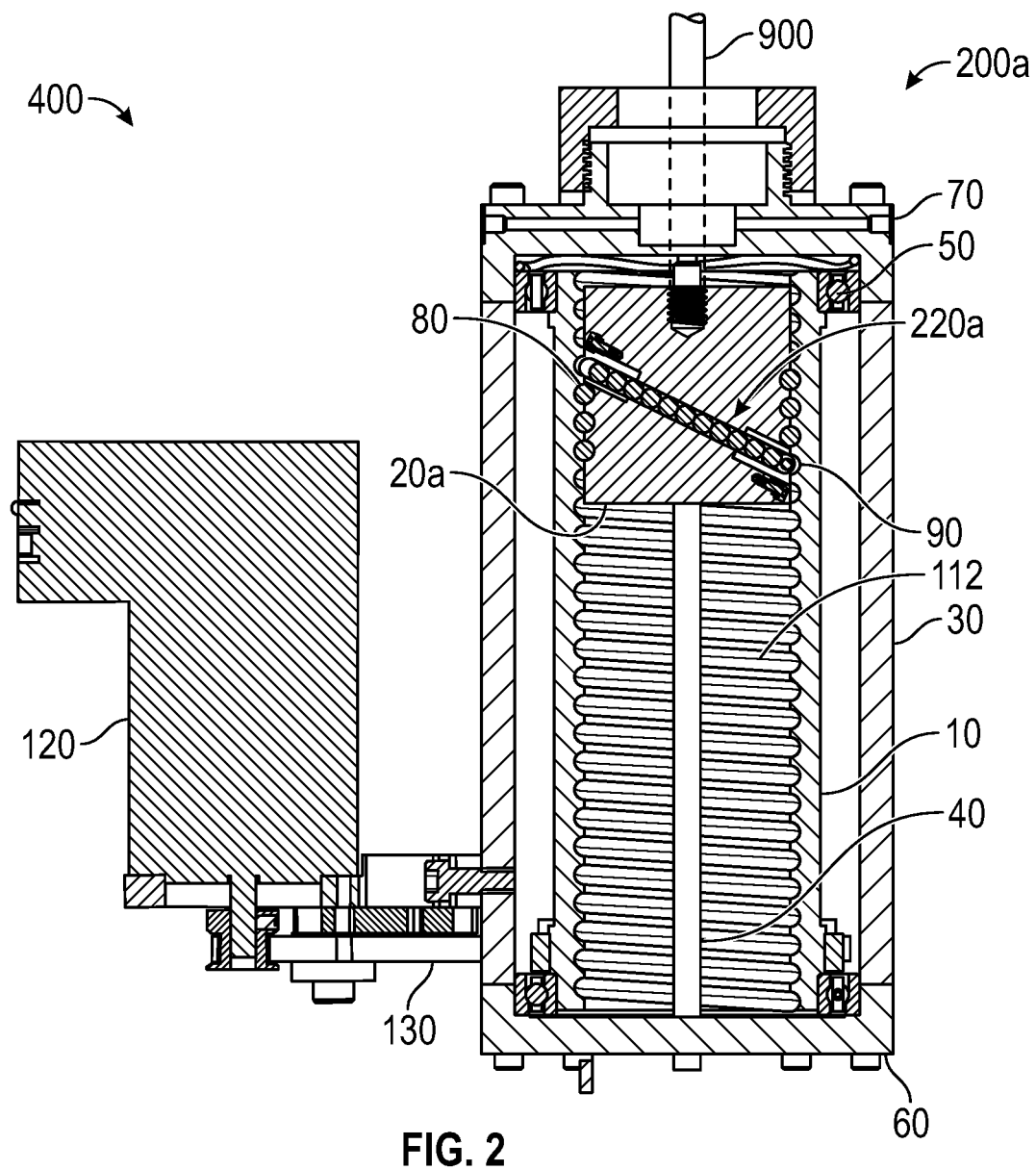
FIG. 2 is a sectional view of the linear actuator assembly taken along line 2-2 of FIG. 1.

FIG. 2 is a sectional view of the linear actuator assembly 400 taken along line 2-2 of FIG. 1. The linear actuator assembly 400, in this implementation, includes a motor 120 driving a first example everted ball screw assembly 200a. As shown, the first example everted ball screw assembly 200a includes a hollow screw shaft 10 with internal threads 112 and a first example ball cylinder 20a with external threads 122a. The ball cylinder 20a is concentrically disposed within a hollow screw shaft 10. The threads 112, 122a are sized and shaped to oppose one another and define between them a substantially continuous working pathway for a plurality of balls 80. After moving along the working pathway, the balls 80 enter and travel through an internal return path 220a which, as shown, passes through the interior of the ball cylinder 20a. The internal return path 220a, together with the working pathway, define a substantially continuous ball circulation pathway. The balls 80 are sized and shaped to fit in a substantially contiguous series when positioned along the ball circulation pathway.

The linear actuator assembly 400, in some implementations, is configured such that the motor 120 imparts rotation to the hollow screw shaft 10, thereby driving the balls 80 along the ball circulation pathway and, in turn, imparting linear motion to the ball cylinder 20a. The ball cylinder 20a, as shown, may be connected to a rod 900. The ball cylinder 20a moves through a linear distance called a stroke length. For the linear actuator assemblies 400 described herein, the housing 30 is slightly longer than the stroke length (plus the thicknesses of the end plates 60, 70) and the entire assembly 400 is about two (2) times the stroke length. A conventional ball screw assembly is more than three (3) times the stroke length. In this aspect, the housings 30 and assemblies 400 described herein are shorter in length and capable of operating in a relatively small space.

The everted ball screw assemblies 200 described herein a larger effective radius (compared to a conventional ball screw) because the balls 80 travel along external threads 122a located on the outer surface 28 of the ball cylinder 20a. A conventional ball screw assembly has a smaller effective radius because the balls travel inside the nut, closer to the central axis of the threaded shaft. Because of the larger effective radius, the everted ball screw assemblies 200 described herein are capable of withstanding eccentric loads without bending or buckling, and without the need for additional support structures. In this aspect, the everted ball screw assemblies 200 described herein are better able to accommodate eccentric loading relative to a similarly sized conventional ball screw.

Figure 3:
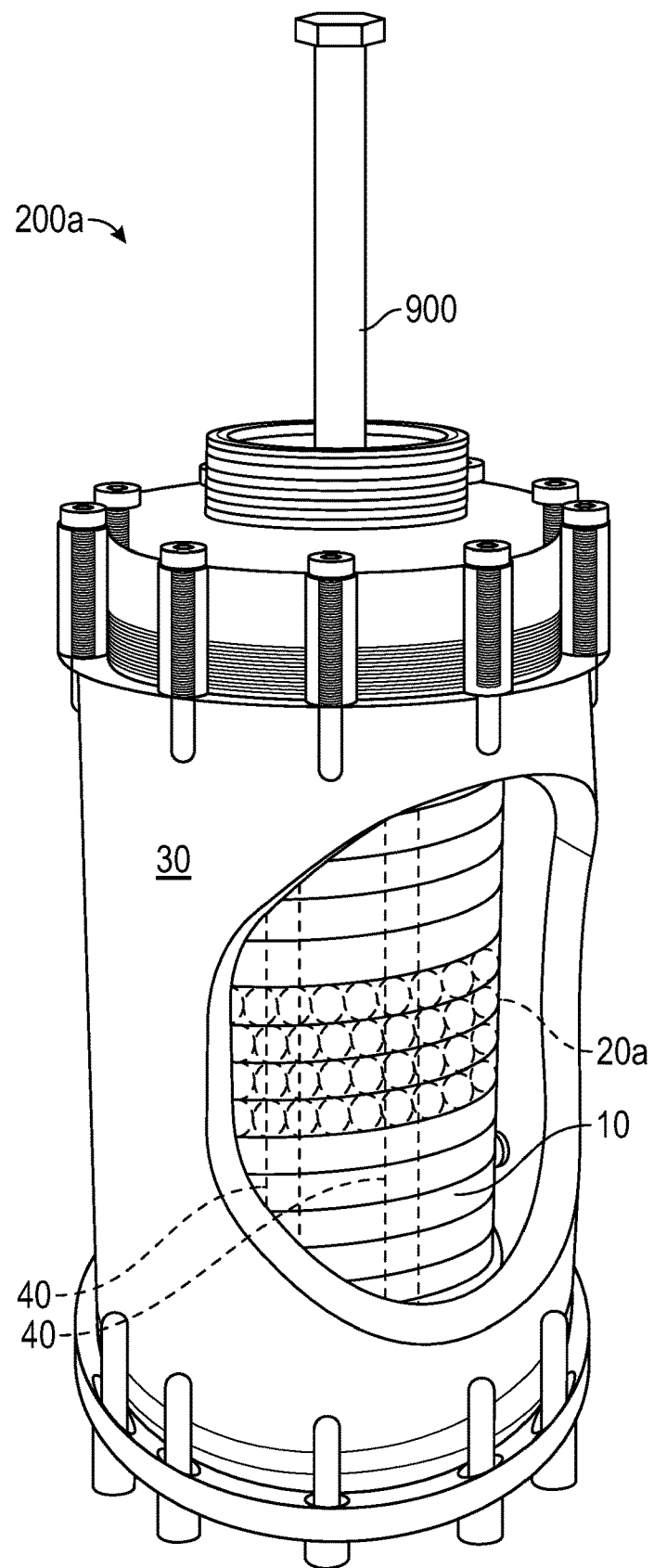
FIG. 3 is a perspective view of an everted ball screw assembly inside a housing, in accordance with some implementations.

FIG. 3 is a perspective view of the first example everted ball screw assembly 200a inside a housing 30. The rod 900 extends through an opening in the upper plate of the housing. The cutaway opening (for illustration purposes only) in the side of the housing 30 shows the ball cylinder 20a inside the hollow screw shaft 10. The assembly 200a also includes a limiter 40 that impedes rotation of the ball cylinder 20a as it travels in a linear direction inside the hollow screw shaft 10. The limiter 40, as shown in this view, includes one or more elongate shafts that are sized and shaped to pass through one or more holes in the ball cylinder 20a unimpeded.

Figure 4:
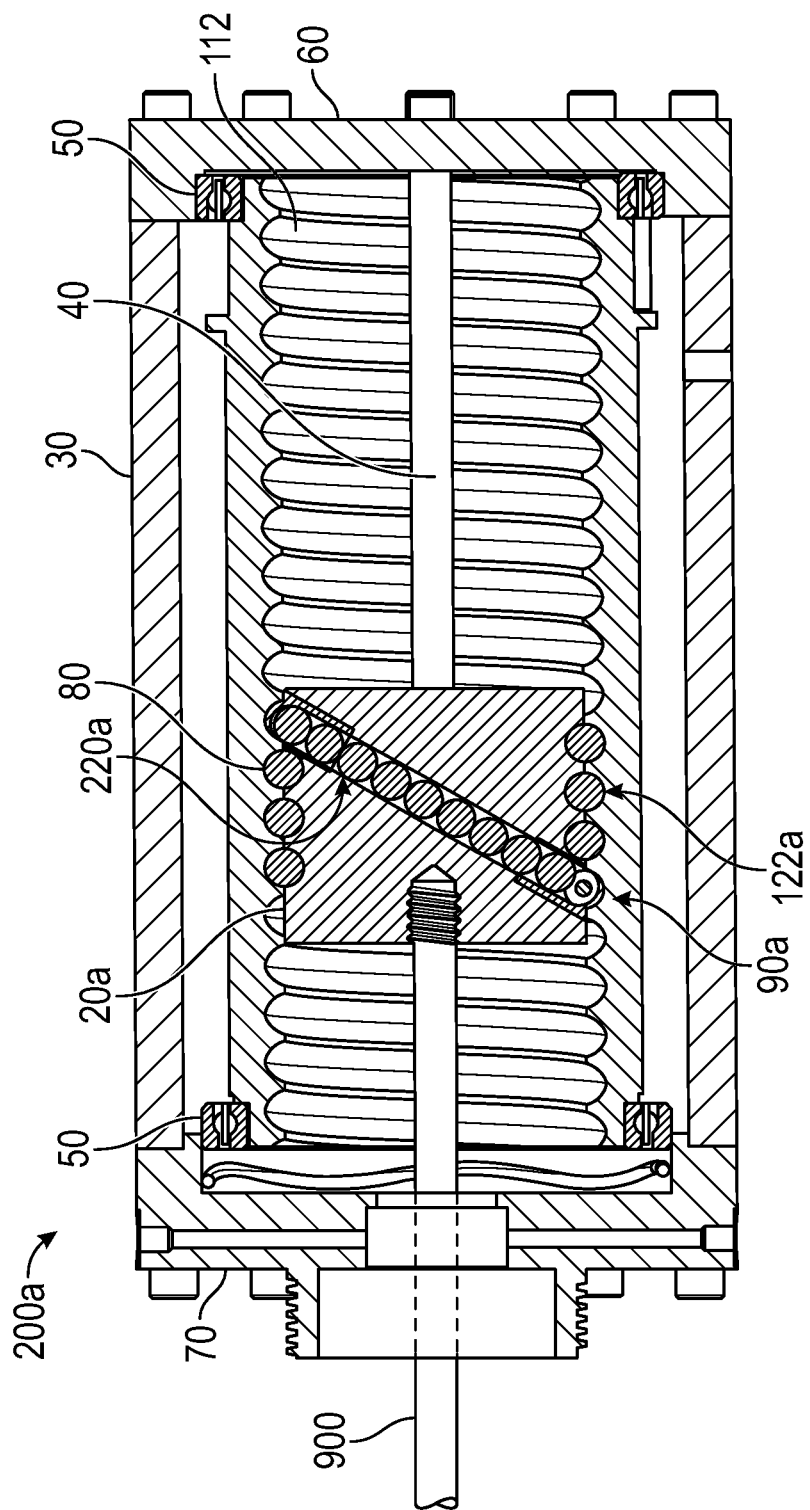
FIG. 4 is a sectional view of an everted ball screw assembly, showing a first example ball cylinder and first internal return path, in accordance with a first implementation.

FIG. 4 is a sectional view of the first example everted ball screw assembly 200a, showing the ball cylinder 20a inside the hollow screw shaft 10. The hollow screw shaft 10 includes an internal thread 112 that extends lengthwise along all or part of the internal surface of the shaft 10, as shown. The first example ball cylinder 20a includes an external thread 122a that is sized and shaped to oppose the internal thread 112 and therebetween define a substantially continuous and generally helical working pathway. The external thread 122a on the ball cylinder 20a may extend lengthwise along all or part of the external surface of the ball cylinder 20a.

As shown, the external thread 122a in this implementation is configured to allow the balls 80 to complete about three and a half turns around the ball cylinder 20a before being guided into the internal return path 220a. The number of turns may be designed to match the expected load capacity to be driven by the ball screw assembly 200a. The number of turns also depends on the course taken by the internal return path.

The matching threads do not engage like a typical nut and bolt, leaving little or no space in-between. Instead, the matching threads 112, 122a are sized and shaped to define an open space—a working pathway along which balls 80 travel between the ball cylinder 20a and the hollow screw shaft 10. The working pathway is sized and shaped to allow a series of balls 80 to roll or slide, generally unobstructed, between the internal thread 112 of the shaft 10 and the external thread 112a of the ball cylinder 20a. The diameter of the balls 80 is selected to fit within the working pathway.

The everted ball screw assembly 200a, as shown, includes a housing 30 and a support bearing 50. The housing 30 is generally cylindrical and includes a base plate 60, a generally opposing upper plate 70, and a sidewall extending between the plates 60, 70. The support bearing 50 allows the hollow screw shaft 10 to rotate about its central axis while impeding its motion in both the linear direction (to prevent translation) and the radial direction (to keep the shaft 10 centered). The support bearing 50, as shown in this example, may include a plurality of rolling-element bearings positioned at one or more locations in the housing 30. The limiter 40, in this example, includes at least one elongate shaft which passes through the ball cylinder 20a to impede rotation.

In operation, the balls 80 circulate along an endless course referred to herein as the ball circulation pathway. After the balls 80 complete a number of turns around the ball cylinder 20a on the working pathway, the balls 80 travel through an internal return path 220a and then return to the working pathway. The return path 220a and the working pathway together define a ball circulation pathway.

The first internal return path 220a extends along a generally linear path through the body of the ball cylinder 20a. The internal return path 220a may be shaped like a hollow tube or channel, as shown in this example, and the return path 220a may be sized to allow the balls 80 to pass through, unobstructed, in a substantially contiguous series.

In some implementations, the first example ball cylinder 20a includes a scoop 90a that is sized and shaped to guide the balls 80 from the working pathway into the internal return path 220a. Another scoop 90a may be positioned to guide the balls 80 out of the return path 220a and back onto the working pathway. In some implementations, the scoop 90a is part of a scoop insert, as described herein, which may cooperate with a lash reduction assembly.

As shown, the plurality of balls 80 move and work as rolling elements along the ball circulation pathway in response to rotation of the hollow screw shaft 10. In other example assemblies, the balls move in response to rotation of the ball cylinder 20a. The number and diameter of the balls 80 is selected so they will fit within the ball circulation pathway, in a substantially contiguous series, along the entire length of the ball circulation pathway. The series of balls 80 is described as substantially contiguous because the number and size of the balls 80 may be selected to minimize the amount of empty space or gaps between balls. This empty space is sometimes called slop, backlash, or lash. The lash may be referred to as the gap distance among all of the plurality of balls 80. The lash can be minimized by coordinating the size and number of the balls 80 with the effective total length of the ball circulation pathway. For example, a ball circulation pathway having a total length of ninety centimeters may accommodate ninety balls, each one centimeter in diameter. Some implementations, as described herein, include a lash reduction assembly.

Figure 5A:
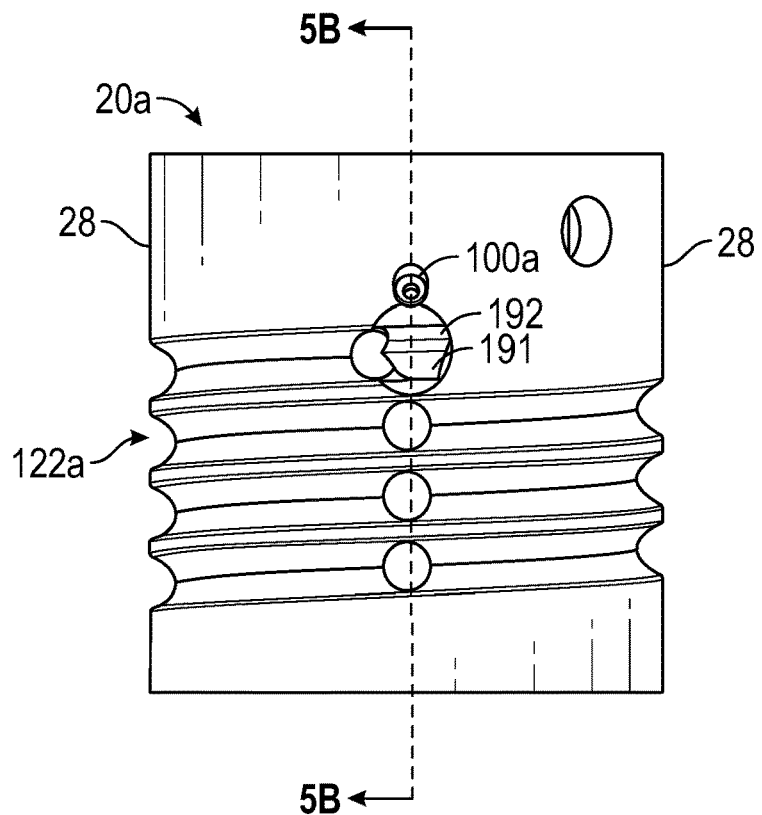
FIG. 5A is a side view of the first example ball cylinder of FIG. 4.

FIG. 5A is a side view of the first example ball cylinder 20a shown in FIG. 4. This view shows that the external thread 122a defines three and a half turns around the outer surface 28 of the ball cylinder 20a. The entrance to the internal return path 220a, in this example, includes a lash reduction screw 110a, which is part of a lash reduction assembly 500a (shown in FIG. 6). Also located at the entrance is a scoop insert 95a (shown in FIG. 6). The scoop portion 90a of the scoop insert 95a, as shown in FIG. 5A, includes a first contour 191 and a second contour 192 on the outermost part of the scoop 90a. These contours 191, 192 are shaped to generally match the shape of the internal thread 112 of the screw shaft 10, so that the scoop 90a will fit within the shape of the helical working pathway without interfering with the internal threads 112 of the screw shaft 10. In this aspect, the contours 191, 192 avoid or reduce friction between the scoop 90a and the nearby threads.

Figure 5B:
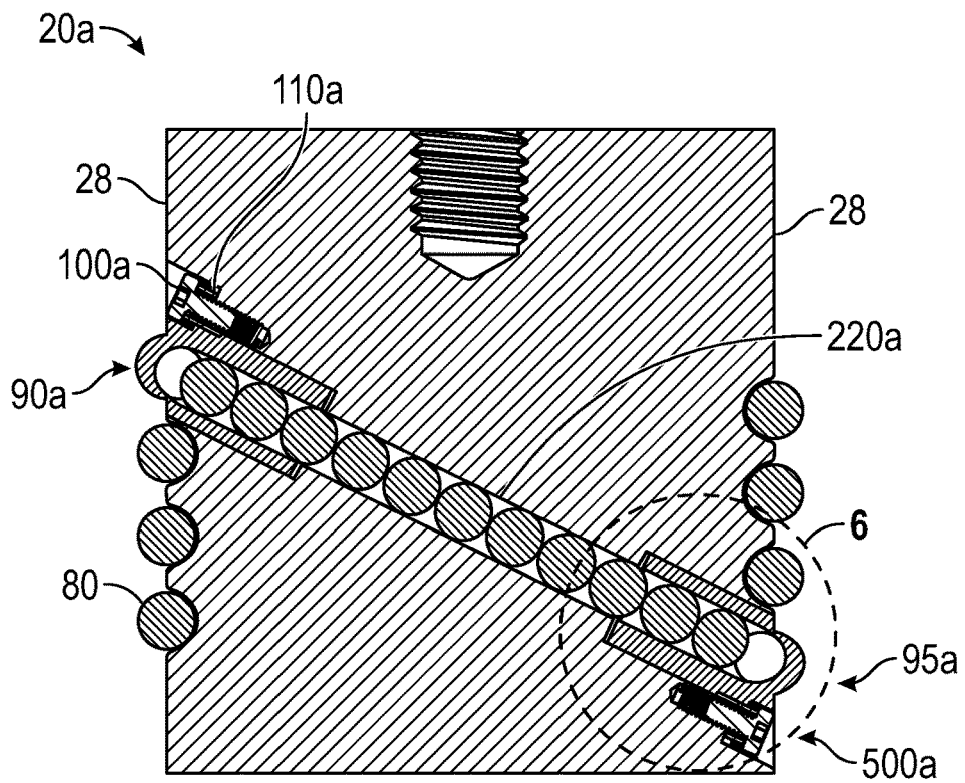
FIG. 5B is a sectional view of the first example ball cylinder taken along line 5B-5B of FIG. 5A.

FIG. 5B is a sectional view of the first example ball cylinder 20a taken along line 5B-5B of FIG. 5A. The plurality of balls 80, as shown, travel along the external thread 122a and are guided into the internal return path 220a by a scoop portion or scoop 90a. The scoop 90a is sized and shaped to guide the balls 80 as they move from the working path to the internal return path 220a. The ball cylinder 20a in this example includes a scoop insert 95a and a lash reduction assembly 500a at both ends of the internal return path 220a. The scoop insert 95a includes a scoop portion 90a and a body portion 96 (shown in FIG. 8A). The lash reduction assembly 500a, as shown, includes the scoop insert 95a, a lash reduction screw 100a, and a lash reduction spring 110a.

Figure 6:
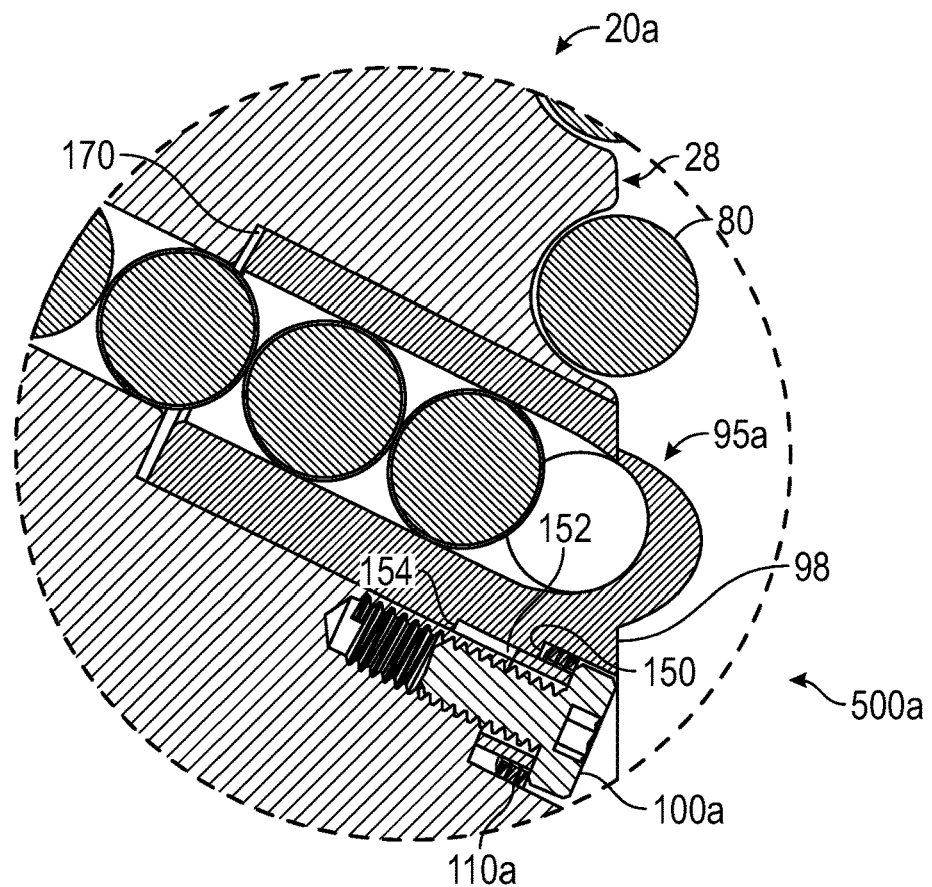
FIG. 6 is a detailed cutaway view of the circular area 6 in FIG. 5B, showing a scoop insert and a lash reduction assembly of the first example ball cylinder.

FIG. 6 is a detailed sectional view of the circular area 6 in FIG. 5B, showing the scoop insert 95a and the lash reduction assembly 500a at both ends of the internal return path 220a. Each ball 80, as shown, rests against the flanks of the external thread 122a. The scoop insert 95a is sized and shaped to guide each ball 80 into the internal return path 220a. The scoop insert 95a may be sized and shaped to be releasably inserted into a sidewall cavity 170 in the ball cylinder 20a. The scoop insert 95a may be positioned within the cavity 170 so that one or more shoulders (upper shoulder 98, for example) is generally aligned with the outer surface 28 of the ball cylinder 20a.

The lash reduction assembly 500a includes the scoop insert 95a, a screw 100a, and a lash reduction spring 110a. The position of the scoop insert 95a relative to the internal return path 220a (and relative to the external surface 28 of the ball cylinder 20a) may be changed by adjusting the screw 100a. The maximum depth of the scoop insert 95a is determined by the depth of the cavity 170. The minimum depth of the scoop insert 95a is determined by the depth at which the ledge 154 contacts the spacer 152. During operation, as the balls 80 pass, the depth of the scoop insert 95a may be maintained by the action of the lash reduction spring 110a. The lash reduction assembly 500a may also include a spacer 152, as shown. In this implementation, the scoop insert 95a includes a first ledge 150, which serves as a support of contact point for the lash reduction spring 110a. The scoop insert 95 also includes a second ledge 154, which facilitates the alignment of the lash reduction assembly 500a relative to the sidewall cavity 170 and also acts as a mechanical stop for the movement of the lash reduction assembly 500a.

Figure 7:
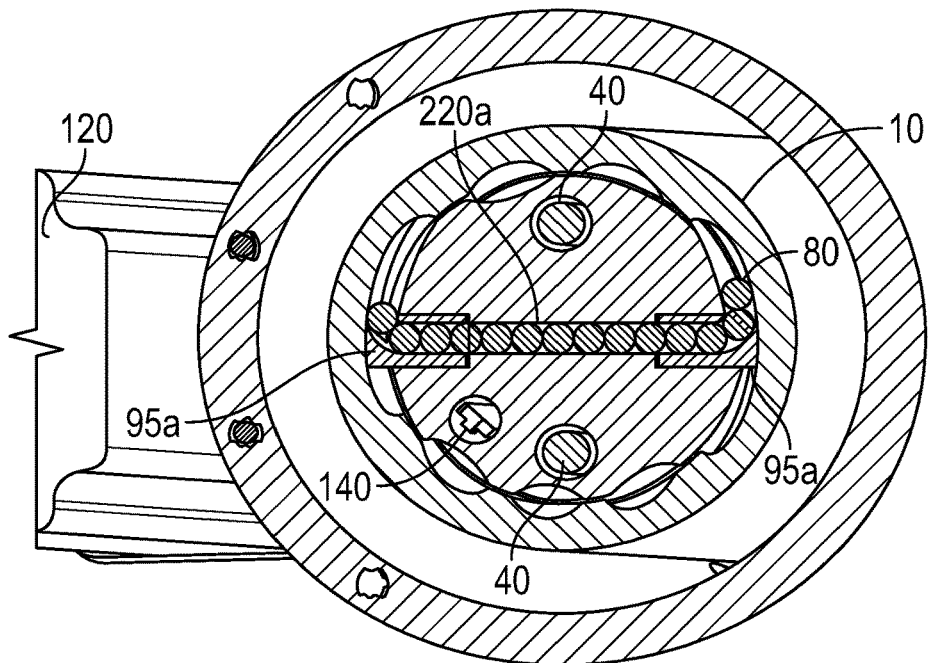
FIG. 7 is a partial, sectional view of the linear actuator assembly shown in FIG. 1, taken through the first example internal return path.

FIG. 7 is a partial, sectional view of the linear actuator assembly 400 shown in FIG. 1. The section is taken through and along the first example internal return path 220a. As shown, the internal return path 220a has a scoop insert 95a positioned at both ends; in other words, an entrance scoop insert and an exit scoop insert. The limiter 40, in this implementation, includes two elongate shafts that are sized and shaped to pass through matching holes in the ball cylinder 20a in order to facilitate unimpeded and linear movement within the hollow screw shaft 10. The linear position sensor 140, in this implementation, includes at least one discrete sensor element that is embedded within the ball cylinder 20a, as shown.

Figure 8A:
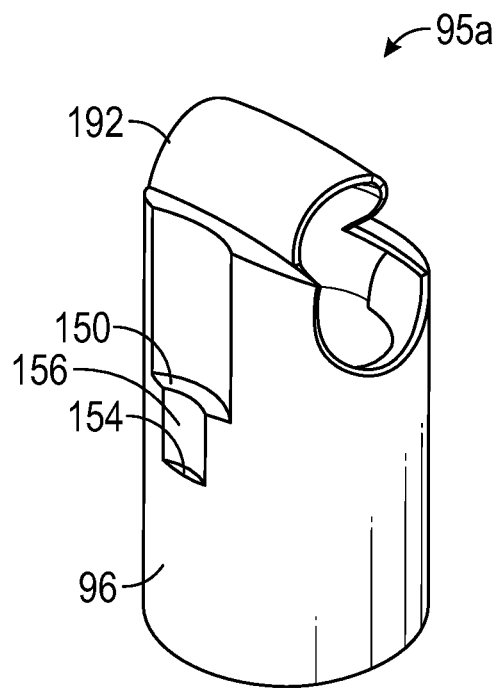
FIGS. 8A through 8F are several views of the scoop insert shown in FIG. 4, FIG. 5B, and FIG. 6.
Figure 8B:
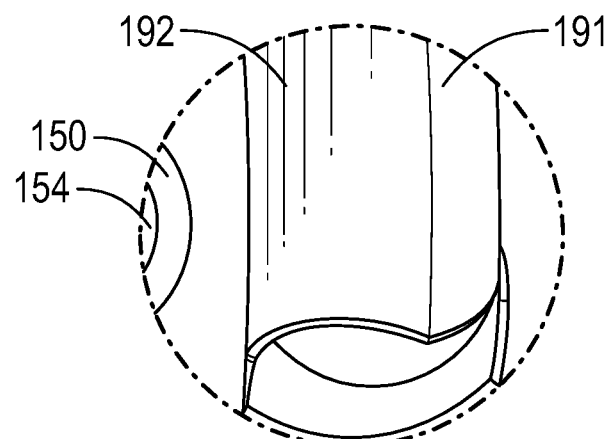
Figure 8C:
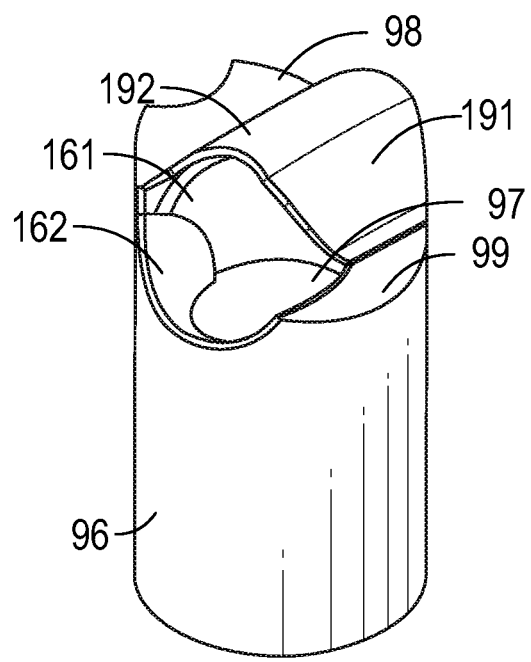
Figure 8D:
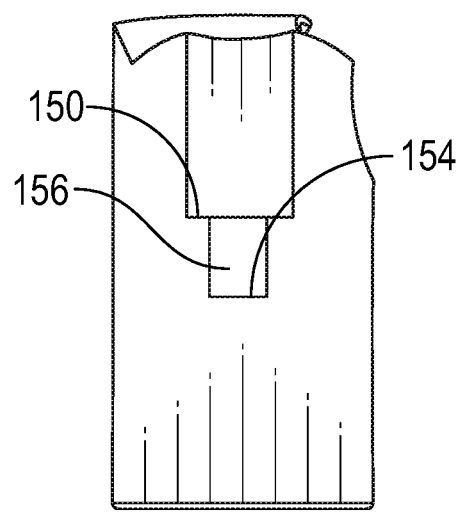
Figure 8E:
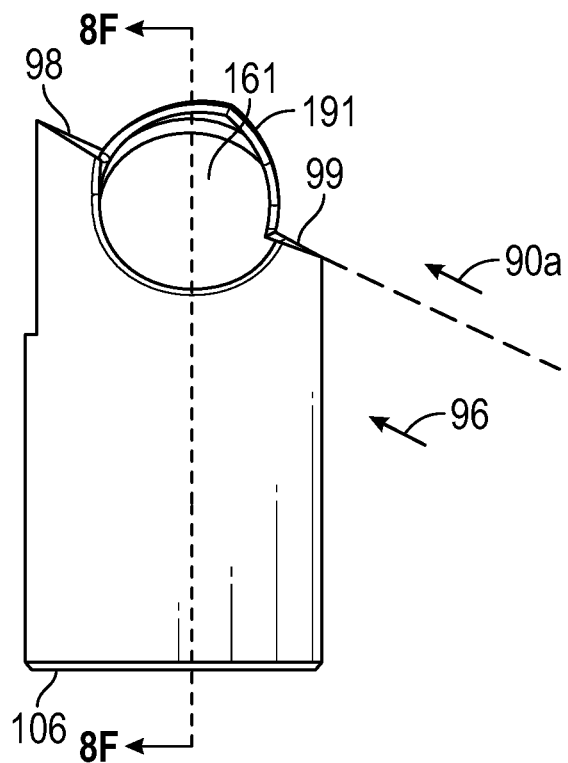

Several views of the scoop insert 95a are shown in FIGS. 8A through 8F. The scoop insert 95a includes a scoop portion 90a and a body portion 96. FIG. 8E is a side view of the scoop insert 95a. The curved plane between the scoop portion 90a and the body portion 96, as shown includes an upper shoulder 98 and a lower shoulder 99 (also shown in FIG. 8C). The shoulders 98, 99 are curved and otherwise shaped to match the external surface 28 of the ball cylinder 20a, as shown in FIG. 6.

The body portion 96 is sized and shaped to be slidably and releasably inserted into a sidewall cavity 170 of the ball cylinder 20a (shown in FIG. 6). The body portion 96 may be generally cylindrical and have a distal end or base 106, as shown, which generally matches the size and shape of the bottom of the sidewall cavity 170. The body portion 96 includes a passage 97 through which the balls 80 travel and enter the internal return path 220a. In this aspect, the passage 97 is in circulatory communication with the working pathway and the internal return path 220a.

The shape of the scoop portion 90a is complex because it fits between the external threads 122a of the ball cylinder 20a and the internal threads 112 of the hollow screw shaft 10. The scoop 90a, as shown in FIG. 6, is oriented at an acute angle relative to the outer surface 28 of the ball cylinder 20a, which complicates the geometry of the scoop's interaction with the internal threads 112 of the hollow screw shaft 10. As shown, the scoop portion 90a includes a first contour 191 and a second contour 192. These contours 191, 192 are shaped to allow the scoop 90a to fit within the shape of the helical working pathway without interfering with the internal threads 112 of the screw shaft 10.

FIG. 8A is a perspective view of the scoop insert 95a, which shows the second contour 192 of the scoop portion 90a. The body portion 96, as shown, includes one or more hollows ending in a first ledge 150 and a second ledge 154. The first ledge 150 serves as a contact point for the innermost end of the lash reduction spring 110a (FIG. 6). The second ledge 154 facilitates the alignment of the lash reduction assembly 500a relative to the sidewall cavity 170. The wall 156, together with the ledges 150, 154, are sized and shaped to facilitate the alignment of various surfaces and features of the scoop insert 95a relative to the sidewall cavity 170.

FIG. 8B is a top view of the scoop insert 95a, showing the contours 191, 192 on the proximal end or top of the scoop 90a and the ledges 150, 154 on the side of the body portion 96.

FIG. 8C is a perspective view of the scoop insert 95a, showing the contours 191, 192 from another perspective. As shown, the scoop 90a includes two or more surfaces shaped to guide the balls 80 into and through the passage 97 which leads to the internal return path 220a. The guiding surfaces, also shown in FIG. 8E and FIG. 8F, in this implementation, include a ball guide 161 and a ball clearance 162. The ball guide 161 is the primary, bowl-shaped internal surface of the scoop 90a for guiding each ball 80 along a generally helical path into the passage 97. The ball clearance 162 is a secondary or additional internal surface that is shaped to guide each ball 80 while allowing for and accommodating both movement of the balls 80 and movement of the scoop insert 95a relative to the sidewall cavity 170, which is reduced and otherwise limited by the lash reduction assembly 500a. In the same way the contours 191, 192 are shaped to match the complex interface with the internal threads 112 of the screw shaft 10, the guides 161, 162 are shaped to match the complex shape of the external threads 122a on the ball cylinder 20a.

FIG. 8D is a side view of the scoop insert 95a, showing the ledges 150, 154 and the side wall 156 located on one side of the body portion 96.

Figure 8F:
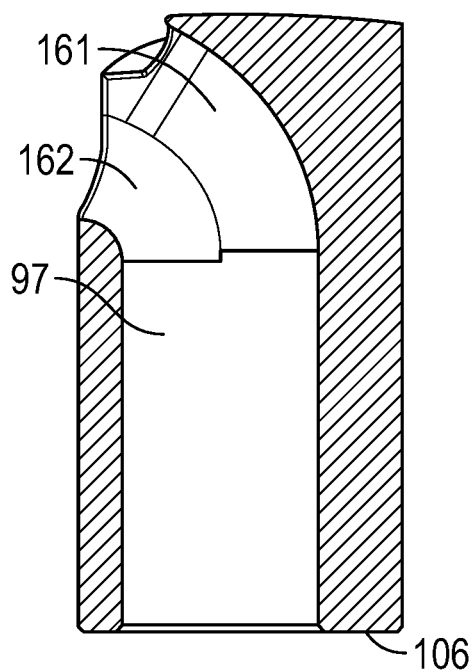

FIG. 8F is a sectional view of the scoop insert 95a taken along line 8F-8F of FIG. 8E. The section intersects part of the upper portion of the ball guide 161. The ball guide 161 in cooperation with the ball clearance 162 guide each ball 80 into the passage 97. The passage 97 is shaped like a hollow tube and sized to accept and allow each ball 80 to travel therethrough unimpeded.

Figure 9:
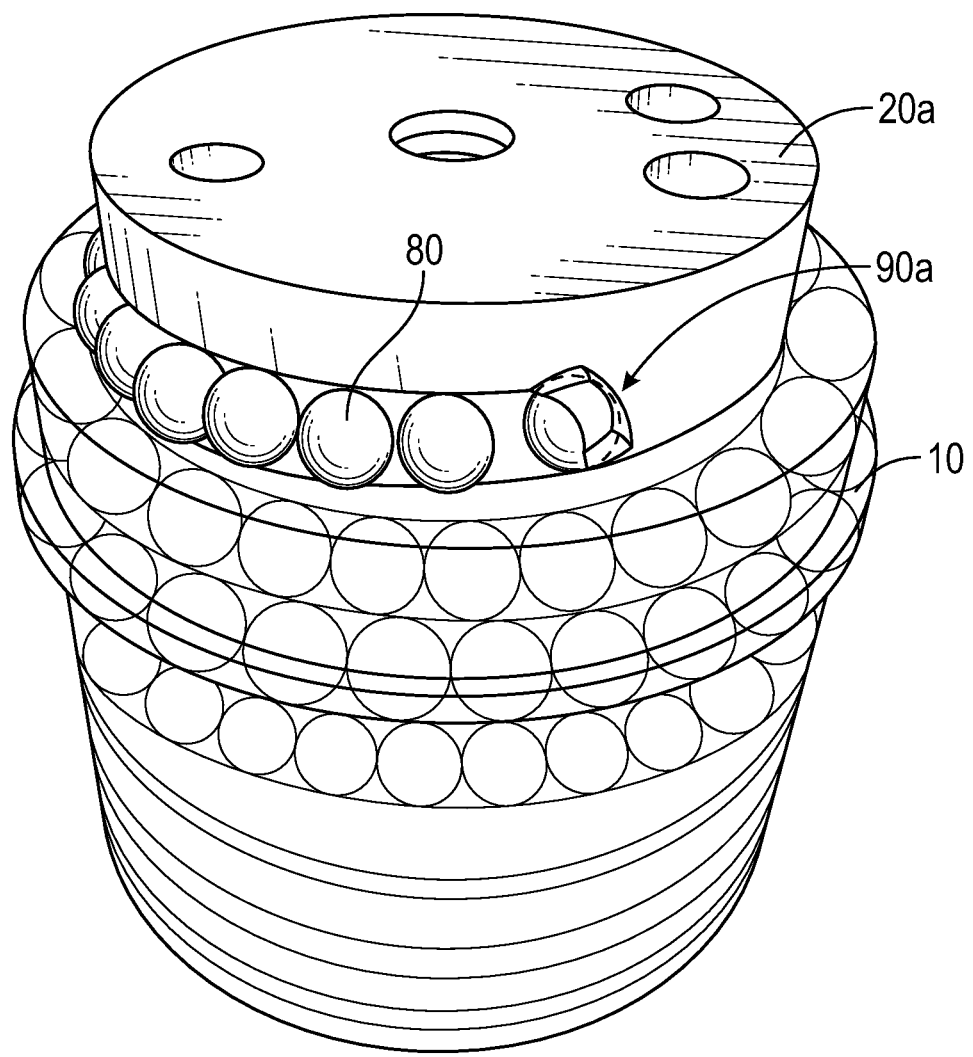
FIG. 9 is a perspective view of a portion of the everted ball screw assembly of FIG. 4, showing a number of balls along a working path and one ball being guided by a scoop into an internal return path.

FIG. 9 is a perspective view of a portion of the everted ball screw assembly of FIG. 4, showing a number of balls 80 along a working path. As shown, one of the balls 80 is being guided by the scoop 90a into the internal return path in the ball cylinder 20a.

Figure 10:
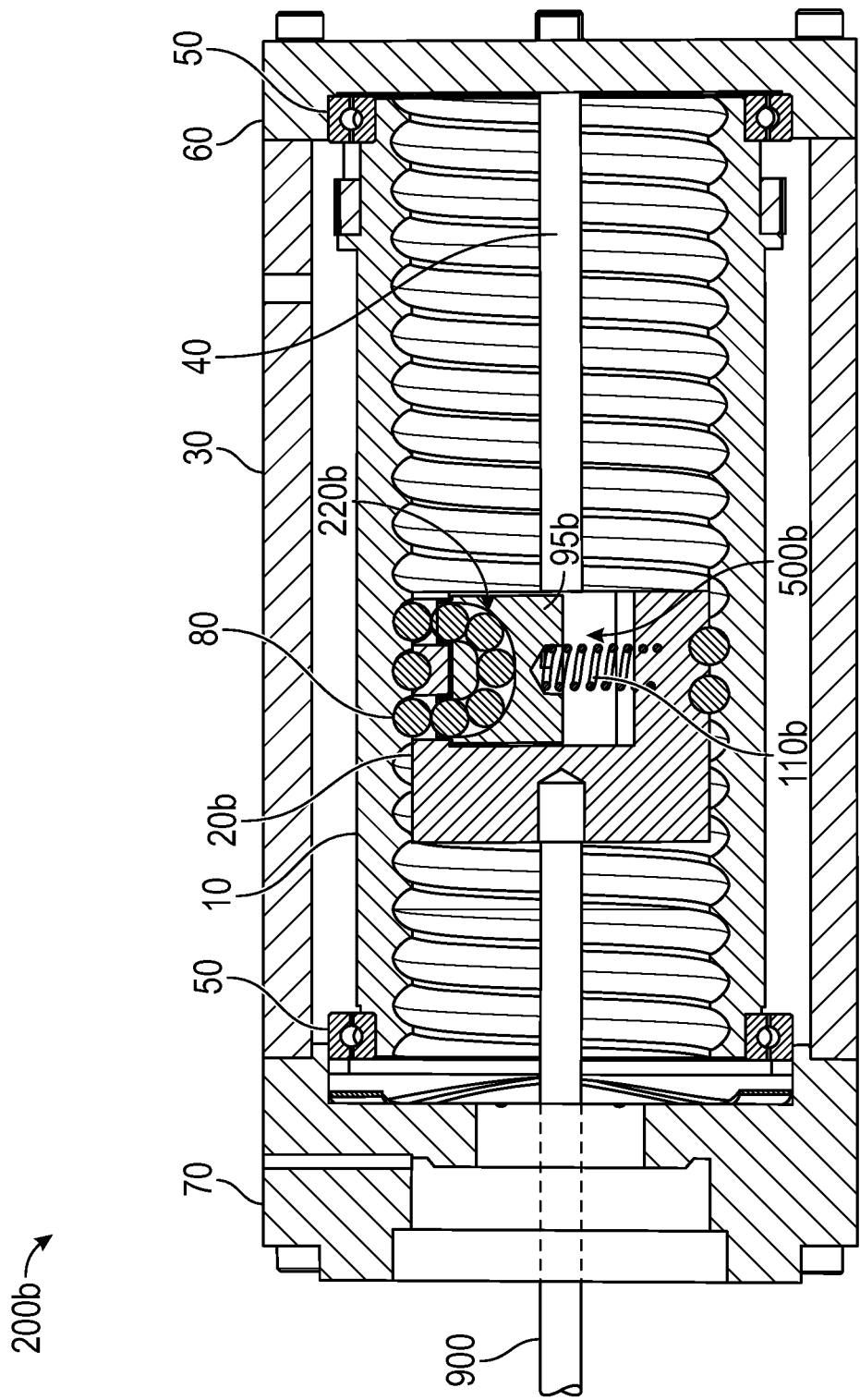
FIG. 10 is a sectional view of an everted ball screw assembly, showing a second example ball cylinder and second internal return path, in accordance with a second implementation.

FIG. 10 is a sectional view of an everted ball screw assembly 200B according to a second implementation. As shown, the second example ball cylinder 20b includes a second internal return path 220b. The return path 220b and the working pathway together define a ball circulation pathway. The return path 220b, in this example, includes a relatively short loop through a portion of the second example ball cylinder 20b. The ball cylinder 20b includes a lash reduction assembly 500b that includes a scoop insert 95b that is moveable using a lash reduction screw and/or a lash reduction spring 110b. Like the first example everted ball screw assembly 200a described herein, the second example everted ball screw assembly 200b shown in FIG. 10 includes a housing 30, a hollow screw shaft 10 supported therein by a bearing 50, and a limiter 40.

Like the other example implementations, the everted ball screw assembly 200B shown in FIG. 10 is connected to a motor 120 (like the one shown in FIG. 2) which rotates the hollow screw shaft 10, thereby imparting linear motion to the ball cylinder 20b, which is connected to a rod 900. The limiter 40 in the example shown FIG. 10 is a pair of rod-shaped limiters 40, like the ones illustrated in FIG. 3.

Figure 11:
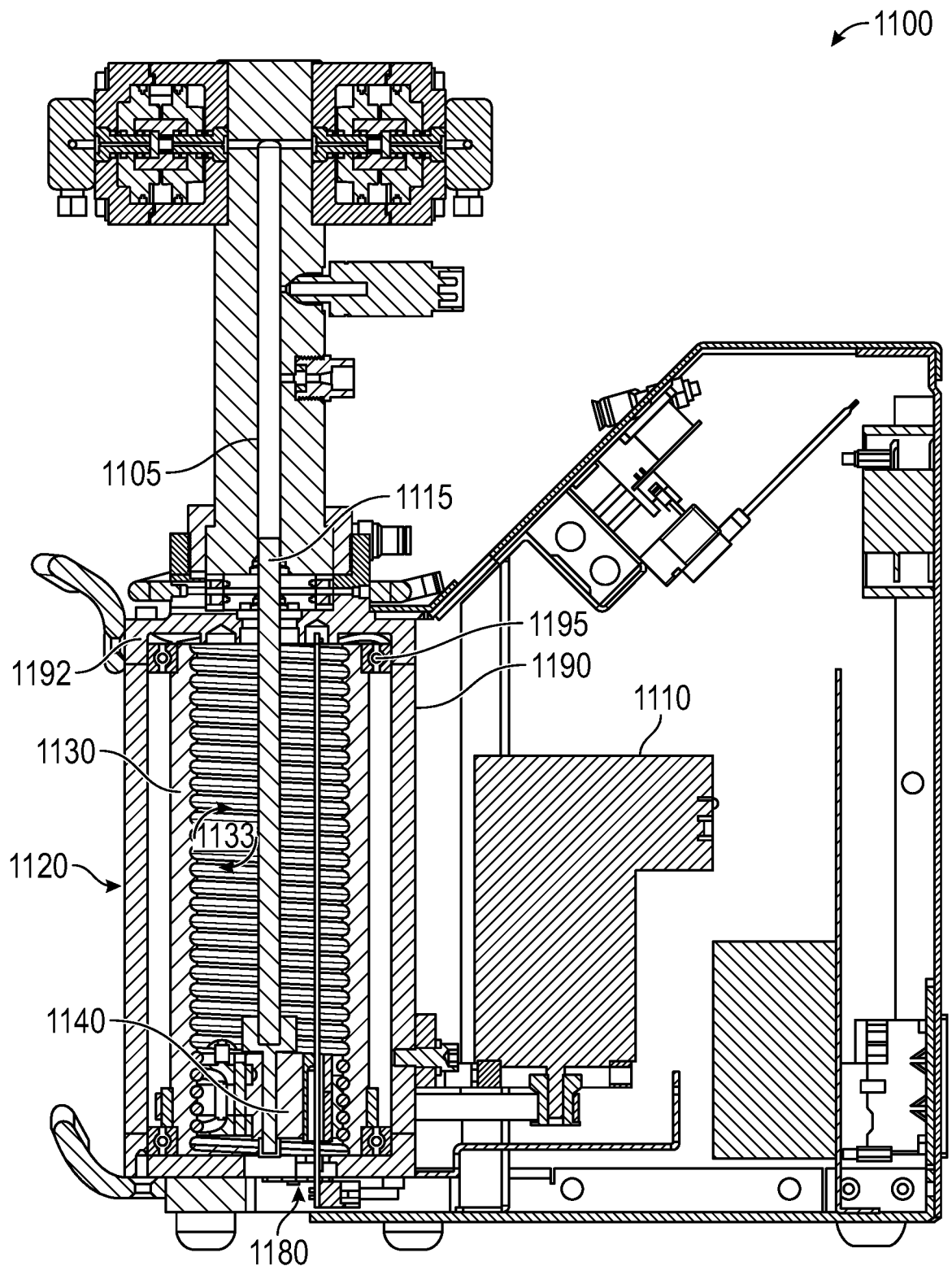
FIG. 11 is a sectional view of an example pump system that incorporates a linear actuator driven by an everted ball screw assembly, in accordance with a third example implementation.

FIG. 11 is a sectional view of an example pump system that incorporates a linear actuator 1100 driven by an everted ball screw assembly 1120, in accordance with a third example. The linear actuator 1100 in this example is oriented vertically along a central axis. The hollow screw shaft 1130 is supported along the central axis by one or more support bearings 1195. The everted ball screw assembly 1120 includes a ball cylinder 1140 that is concentrically disposed within the hollow screw shaft 1130. The ball cylinder 1140 and has an external thread that is sized and shaped to oppose the internal thread of the hollow screw shaft 1130. The mated threads define a working pathway for a plurality of balls of uniform size. The working pathway, together with an internal return path through the ball cylinder 1140, form a substantially continuous ball circulation pathway. The balls are selected in number and size to fit along the ball circulation pathway in a substantially contiguous series. The ball diameter is selected such that each ball along the continuous ball circulation pathway maintains four points of contact; two points of contact with the male thread surfaces and two points of contact with the female thread surfaces.

The linear actuator 1100 includes one or more limiter elements that are positioned to inhibit rotation of the ball cylinder 1140 during operation. In the example implementation shown in FIG. 11, the linear actuator 1100 includes one or more limiters, as described herein, which pass through the ball cylinder 1140 and are coupled at both ends to the housing 1190. The limiters inhibit rotation of the ball cylinder 1140 relative to the housing 1190, thereby limiting the ball cylinder 1140 to linear motion through the hollow screw shaft 1130.

The linear actuator 1100 in this example includes a connecting rod 1115 that is coupled at its proximal end to the ball cylinder 1140 and extends along the central axis to a distal end, which is coupled to a load to be actuated. As shown in FIG. 11, the connecting rod 1115 extends into a cylinder 1105 mounted above the housing 1190. The term connecting rod 1115, as used herein, should be understood to mean and include any mechanism that transmits a load, including but not limited to a piston, a rod, a cable, a mechanical linkage, or other element that links the motion and force of the moving ball cylinder 1140 to another element. Moreover, the load transmission mechanism may be connected to the ball cylinder 1140 at any of a variety of locations and configurations, such as a single connecting rod 1115 connected along the central axis as described herein, or as multiple elements connected at different points along the ball cylinder 1140.

The motor 1110 is configured to rotate the hollow screw shaft 1130, which drives the plurality of balls along the ball circulation pathway, which in turn imparts a linear motion to the ball cylinder 1140 and to the connecting rod 1115. In this example, rotation of the hollow screw shaft 1130 in a horizontal plane about the central axis imparts linear motion to the ball cylinder 1140 and the connecting rod 1115 in a vertical direction, up and down, parallel to the central axis.

The housing 1190 includes a base plate, an opposing end plate 1192, and a sidewall that surrounds the everted ball screw assembly 1120, as shown. The connecting rod 1115 extends through an opening in the end plate 1192. The hollow screw shaft 1130 is described as hollow because it defines a substantially open chamber 1133 along its length from the base plate to the end plate 1192. The open chamber 1133 allows nearly all the connecting rod 1115 to be retracted through the opening in the end plate 1192 when the ball cylinder 1140 is fully retracted to its position near the base plate, as shown in FIG. 11. In this aspect, the open chamber 1133 allows the overall linear actuator 1100 and its housing 1120 to be relatively small, compared to other types of linear actuators in which the connecting rod cannot be fully retracted.

Figure 12:
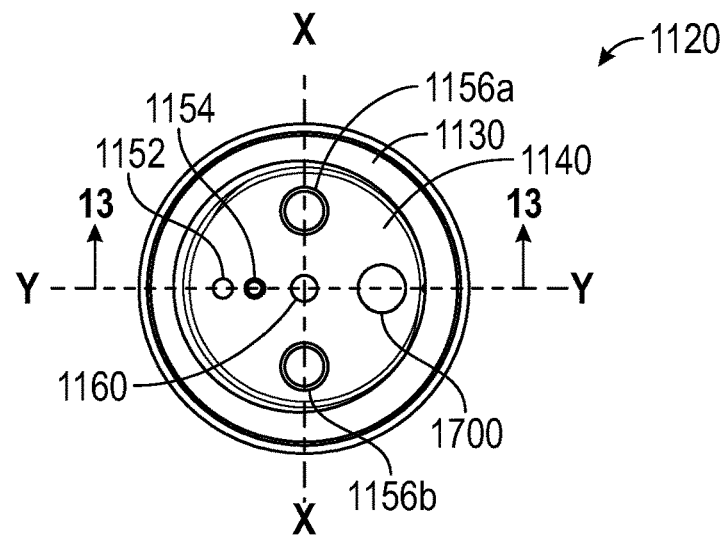
FIG. 12 is a top view of the everted ball screw assembly of FIG. 11.
Figure 13:
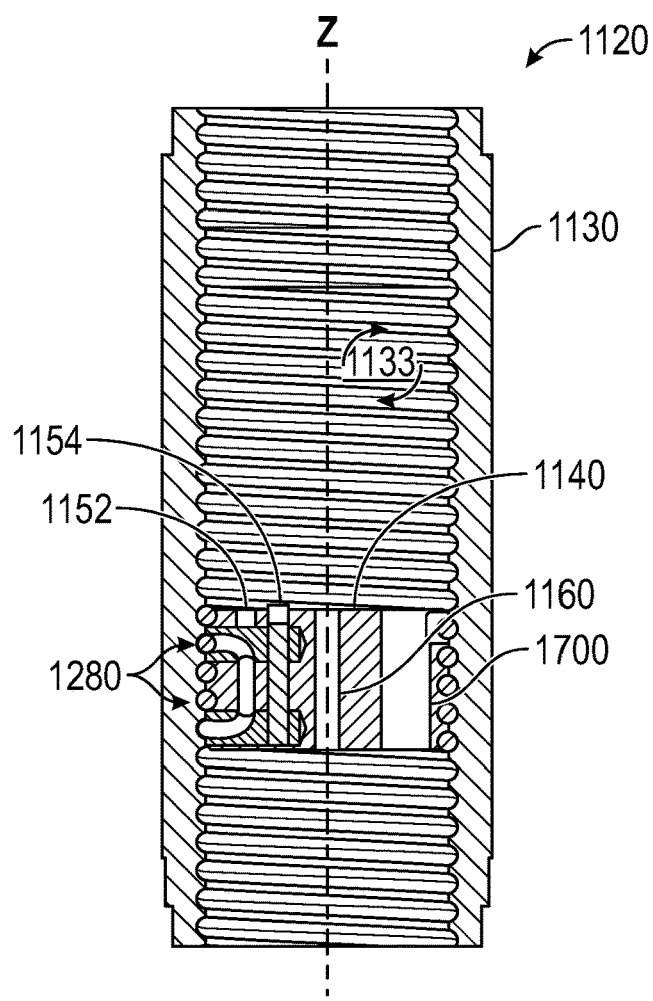
FIG. 13 is a transverse sectional view of the everted ball screw assembly taken along line 13-13 of FIG. 12.

FIG. 12 is a top view of the everted ball screw assembly 1120 of FIG. 11 The linear actuator 1100 in this example is oriented vertically along a central axis, which may also be referred to as the Z axis (shown in FIG. 13). The linear motion of the ball cylinder 1140 and connecting rod 1115 takes place along the Z axis. For reference, as shown in FIG. 12 and used herein, a longitudinal axis X extends horizontally from back to front. A transverse axis Y extends horizontally from right to left and is orthogonal to the X axis.

The ball cylinder 1140 in this example includes central bore 1160 along the Z axis through which the connecting rod 1115 attaches. Along the X axis, there is a first opening 1156a that is sized and shaped to slidably receive a first limiter 1170a. On the opposing side, and also located along the X axis, there is a second opening 1156b that is sized and shaped to slidably receive a second limiter 1170b. In this example, the limiters 1170a, 1170b extend through the ball cylinder 1140 along a common diameter (i.e., along the X axis) and, as shown, may be located the same radial distance away from the central axis.

Along the Y axis, starting at the left end, there is a vertical hole 1152, in this example, formed by drilling into the top surface of the ball cylinder 1140 to create a vertical passage 1230, as described herein. Next, there is a vertical opening 1154 that is sized and shaped to receive a dowel 1174, as described herein. Near the right end of the Y axis is a cavity for receiving a sensor support sleeve 1700 that houses elements of the linear position sensor assembly 1180, as described herein. In other example embodiments, the linear position can be sensed using the motor 1110 instead of installing a linear position sensor assembly 1180.

FIG. 13 is a transverse sectional view of the everted ball screw assembly 1120 taken along line 13-13 of FIG. 12. The hollow screw shaft 1130 defines an open chamber 1133 and has an internal thread 1132. The ball cylinder 1140 and has an external thread 1142 that is sized and shaped to oppose the internal thread 1132 of the hollow screw shaft 1130. The mated threads 1142, 1132 define a working pathway for a plurality of balls 1280 of uniform size. The working pathway, together with an internal return path 1200 through the ball cylinder 1140, form a substantially continuous ball circulation pathway. The balls 1280 may move in either direction, of course, back and forth through the internal return path 1200 and all the entirety of the ball circulation pathway. The connecting rod and the limiters are not shown in FIG. 13.

Figure 15:
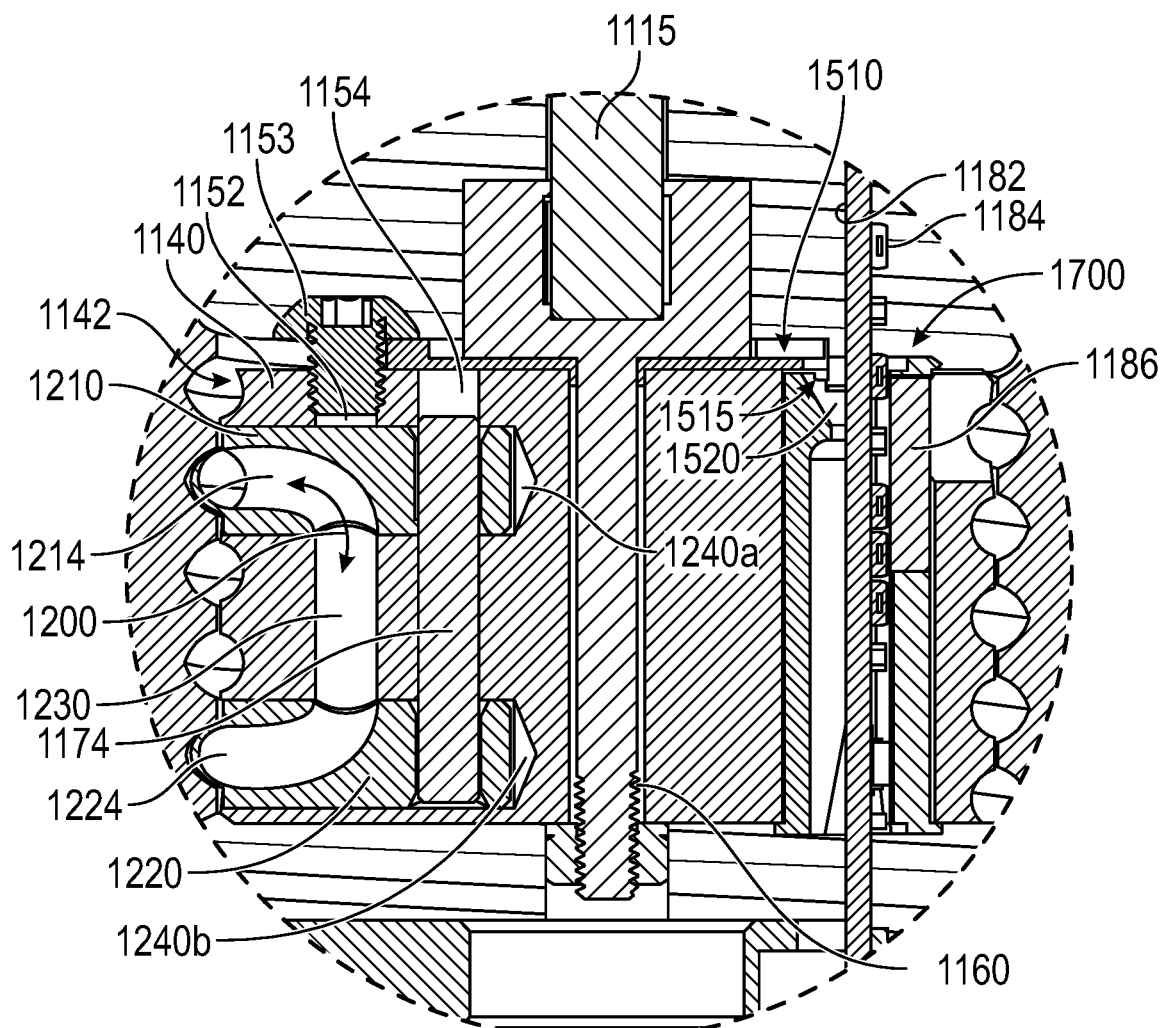
FIG. 15 is a sectional view of the ball cylinder of FIG. 11.

Referring to FIG. 15, which is a sectional view of the ball cylinder 1140, the internal return path 1200 through the ball cylinder 1140, in this example, includes a first internal passage 1214, a vertical passage 1230, and a second internal passage 1224. The ball cylinder 1140, as shown, has a top surface, a generally opposing bottom surface, and an outer wall. The external thread 1142 is located along the outer wall of the ball cylinder 1140.

The ball cylinder 1140, as shown, includes a first bore 1240a extending radially from the outer wall toward the central axis. The first bore 1240a is sized and shaped to slidably receive a first scoop insert body 1210.

The ball cylinder also includes a second bore 1240b which is spaced apart vertically from and substantially parallel to the first bore 1240a. The second bore 1240b also extends radially from the outer wall. The second bore 1240b is sized and shaped to slidably receive a second scoop insert body 1220.

Figure 18:
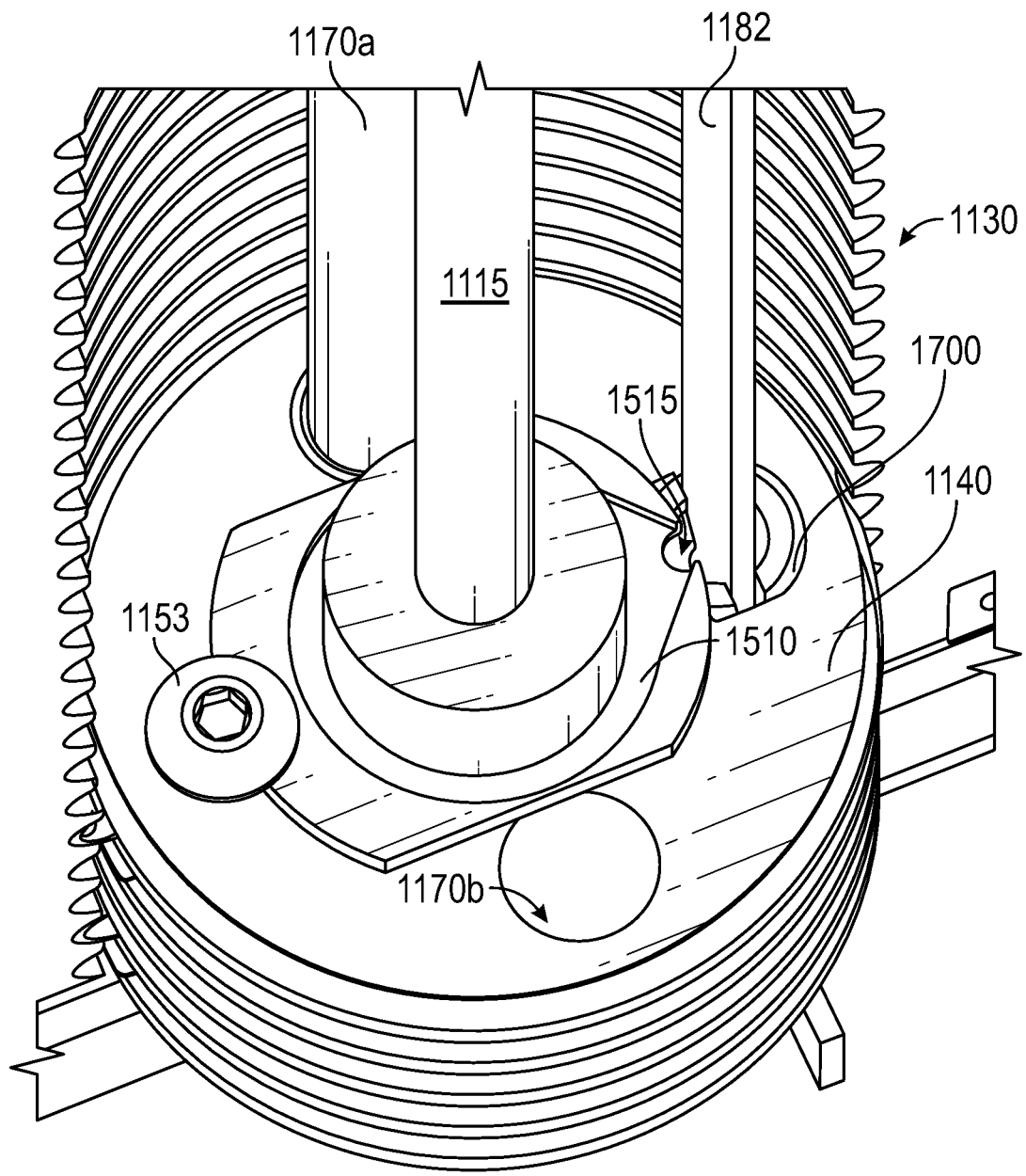
FIG. 18 is a perspective view of the ball cylinder of FIG. 11.

A vertical passage 1230, as shown, extends parallel to the central axis and connects the first bore 1240a to the second bore 1240b. In this example, the vertical hole 1152 extends from the top surface of the ball cylinder 1140, extends through the first bore 1240a, and ends within the second bore 1240b. In some example implementations, the vertical hole 1152 is covered by a cap 1153. The cap 1153, as shown in FIG. 18, may also serve to locate and retain the tray 1510 as described herein.

A dowel 1174 is positioned in the vertical opening 1154, which in this example does not extend all the way through the ball cylinder 1140. The dowel 1174, as described herein, retains the first and second scoop insert bodies 1210, 1220 inside the first and second bores 1240a, 1240b, respectively. The central bore 1160 is sized and shaped to receive the connecting rod 1115, as described herein. The sensor support sleeve 1700 houses various elements of the linear position sensor assembly 1180, as described herein.

In one example implementation, the hollow screw shaft 1130 has an outer diameter of about 2.71 inches, the ball cylinder 1140 has a diameter of about 2.00 inches, and the balls 1280 have a diameter of about 5/32 inch. The mated threads 1142, 1132 have a lead or pitch of about 6 millimeters. For lubrication, the balls 1280 and threads 1142, 1132 may be coated with a thin film of a suitable grease or oil. For applications moving lighter loads at lower speeds, the linear actuator 1100 may be operated with no lubrication.

Figure 14:
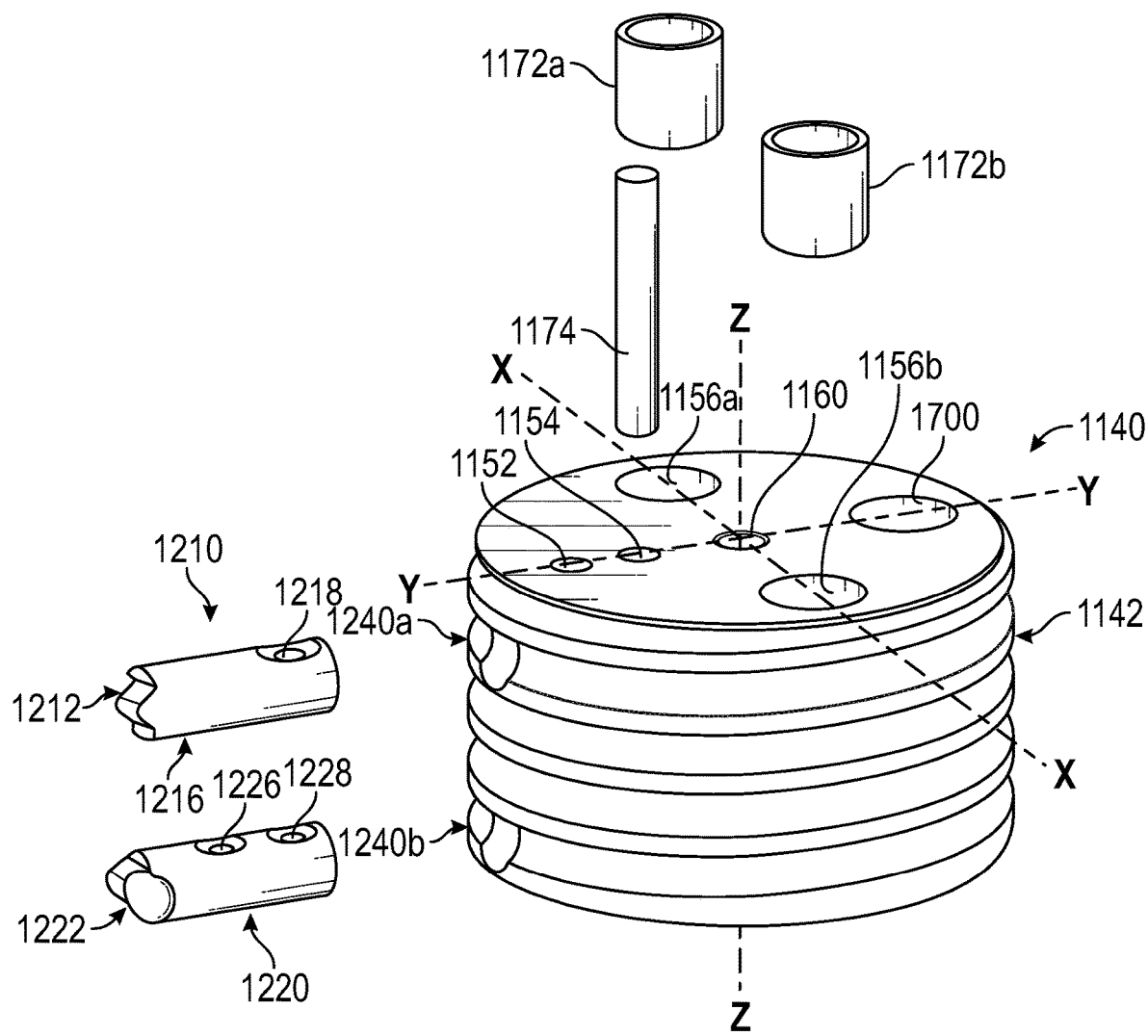
FIG. 14 is an assembly view of the ball cylinder of FIG. 11.

FIG. 14 is an assembly view of the ball cylinder 1140 along with the coordinate axes (X, Y, Z) described herein. The dowel 1174, as shown, functions to retain the first and second scoop insert bodies 1210, 1220 when inserted. The first and second bearing sleeves 1172a, 1172b are sized and shaped to be positioned between the first and second limiters 1170a, 1170b (not shown) and their respective first and second openings 1156a, 1156b, which pass all the way through the ball cylinder 1140. The bearing sleeves 1172a, 1172b may be any type of linear bearing, including but not limited to solid bearings, ball bearings, roller bearings, and the like, which are suitable for facilitating the sliding relationship between the limiters and the openings while also facilitating a proper alignment of the ball cylinder 1140 in its vertical orientation as it moves through the open chamber 1133 of the hollow screw shaft 1130. The bearing sleeves 1172a, 1172b may be made of any suitable material, such as metal, plastic, polymers, ceramics, or composite materials. In one example implementation, the bearing sleeves 1172a, 1172b have an outer diameter of 10 millimeters, a bore diameter of 8 millimeters, and a length of 10 millimeters.

The first scoop insert body 1210 includes a first scoop 1212 that is sized and shaped to guide the balls 1280 between the working pathway and a first internal passage 1214 (see FIG. 15). The first scoop insert body 1210 also includes a first vertical opening 1218 that is sized and shaped to slidably receive the dowel 1174. On the underside of the first scoop insert body 1210, in this view, is the first portal 1216, which connects to the vertical passage 1230 as described herein.

The second scoop insert body 1220 includes a second scoop 1222 that is sized and shaped to guide the balls 1280 between the working pathway and a second internal passage 1224 (see FIG. 15). The second scoop insert body 1220 also includes a second vertical opening 1228 that is sized and shaped to slidably receive the dowel 1174. Also visible in this view of the second scoop insert body 1220 is the second portal 1226, which connects to the vertical passage 1230 as described herein.

FIG. 15 is a sectional view of the ball cylinder 1140 taken along the transverse Y axis. The first bore 1240a extends radially from the outer wall of the ball cylinder 1140 toward the central Z axis. The first bore 1240a, a shown, is sized and shaped to form a seat for the inner end of the first scoop insert body 1210. The second bore 1240b is spaced apart vertically from and substantially parallel to the first bore 1240a and, as shown, is sized and shaped to form a seat for the inner end of the second scoop insert body 1220.

The vertical hole 1152 extends from the top surface of the ball cylinder 1140, extends through the first bore 1240a, and ends within the second bore 1240b. The vertical hole 1152 creates the vertical passage 1230 that extends between the first bore 1240a and the second bore 1240b.

The dowel 1174 is positioned in the vertical opening 1154 which extends from the top surface of the ball cylinder 1140, extends through the first bore 1240a, and ends within the second bore 1240b. The dowel 1172 in one example implementation has a diameter of about 5/32 inch, a length of about 1.00 inch, and is made of 18-8 stainless steel.

The connecting rod 1115 in this example, extends through a central bore 1160 in the ball cylinder 1140 and is secured at the bottom by a nut.

The first and second scoop insert bodies 1210, 1220 in this example are sized and shaped to be inserted into the first and second bores 1240a, 1240b respectively, as shown. The first scoop insert body 1210 includes a first scoop 1212 and a first internal passage 1214. The first scoop 1212 is sized and shaped to guide the plurality of balls 1280 between a first valley 1144a of the external thread 1142 along the working pathway and the first internal passage 1214. The first scoop 1212 includes one or more contoured surfaces which, together, correspond in size and shape to the shape of the helical working pathway defined between the mated threads 1142, 1132. In one example implementation, the balls 1280 have a diameter of 5/32 about inch and the first scoop 1212 is shaped to maintain a first clearance of about 0.005 inch between the scoop 1212 and the internal thread 1132 of the hollow screw shaft 1130. The first clearance may vary at different points along the pathway.

The first scoop insert body 1210 also includes a first portal 1216 between the first internal passage 1214 and the vertical passage 1230. The first internal passage 1214 is curved, as shown, having a first radius of curvature that guides the balls 1280 between the first portal 1216 and the vertical passage 1230. Likewise, the second scoop insert body 1220 includes a second portal 1226 between the vertical passage 1230 and the second internal passage 1224. The second internal passage 1224 is curved, as shown, having a second radius of curvature that guides the balls 1280 between the second portal 1216 and the vertical passage 1230.

In one example implementation, the balls 1280 have a diameter of about 5/32 inch (i.e., about 0.157 inch) and the passages 1214, 1224, 1230 have a diameter of about 0.158 inch, thereby providing a clearance distance of about 0.001 inch between the balls the inner walls of the passages 1214, 1224, 1230. The clearance distance may vary at different points along the passages.

The second scoop 1222 is sized and shaped to guide the plurality of balls 1280 between a second valley 1144b of the external thread 1142 along the working pathway and the second internal passage 1224. Like the first scoop 1212, the second scoop 1222 includes one or more contoured surfaces which, together, correspond in size and shape to the shape of the helical working pathway defined between the mated threads 1142, 1132. In one example implementation, the balls 1280 have a diameter of about 5/32 inch and the second scoop 1222 is shaped to maintain a second clearance of about 0.005 inch between the scoop 1222 and the internal thread 1132 of the hollow screw shaft 1130. The second clearance may vary at different points along the pathway.

The dowel 1174 as shown is inserted through a first vertical opening 1218 in the first scoop insert body 1220 and through a second vertical opening 1228 in the second scoop insert body 1220.

The internal return path 1200, as shown, does not include a lash reduction assembly. The term lash or backlash refers to the amount of clearance in a mechanism caused by gaps between the parts. In a ball screw assembly, the term lash may refer to the amount of empty space or gaps between the balls along a pathway, or between the balls and sidewalls or threads. Axial lash, as used herein, refers to the amount of linear movement of the ball cylinder, along its axis. Lash can be reduced by pre-loading one or more components; for example, maintaining a static load applied to the ball cylinder, thereby minimizing the effect of any lash between components. Lash can be reduced by selecting a ball diameter such that each ball along the continuous ball circulation pathway maintains four points of contact—two points of contact with the male thread surfaces and two points of contact with the female thread surfaces. When the balls are sized to maintain four points of contact, the presence of any empty space or gaps between the balls will not typically cause an axial lash. In some example implementations, the ball diameter and the geometry of the mating threads 1132, 1142 are correlated, during design and construction of the linear actuator 1100 described herein, to minimize lash in the axial direction, such that no lash reduction assembly is required.

The sensor support sleeve 1700 supports at least one magnet 1186 and defines a track opening 1158 that is oriented parallel to the central Z axis and extends all the way through the ball cylinder 1140. The track opening 1158 is sized and shaped to slidably receive a track 1182, which includes a number of magnetic field sensors 1184 evenly spaced apart along its length. The track 1182 is oriented parallel to the central Z axis and is supported by the housing 1190 at both ends. The track 1182 in this example includes a sensor PCB (i.e., a sensor element disposed on a thin, printed circuit board (PCB) which is incorporated into the body of the track 1182). The evenly spaced magnetic field sensors 1184 are distributed along the entire stroke length traveled by the ball cylinder 1140 during its linear movement up and down the track 1182. As shown in FIG. 15, two additional sensors 1184 may be located near the bottom of the track (and near the top, not shown) to inhibit over-travel of the ball cylinder 1140 beyond its limits.

In operation, as the ball cylinder 1140 moves linearly up and down the track 1182, the magnet 1186 passes by one or more of the magnetic field sensors 1184. The magnet 1186 in this example is sized in length such that at least one of the magnetic field sensors 1184 senses the magnet at all times. One or more of the magnetic field sensors 1184 detects the magnetic field generated by the magnet 1186. Using the field data collected by the sensors 1184, the linear position assembly generates a signal that is representative of a linear position of the magnet 1186 relative to the track 1182. In this aspect, the assembly senses and detects the precise location of the ball cylinder 1140 along its stroke length as it moves linearly up and down the track 1182.

Referring briefly to FIG. 11, the connecting rod 1115 in this example moves up and down through a cylinder, as shown, thereby moving a column of working fluid. During operation, some of the working fluid may leak into the everted ball screw assembly 1120. The linear actuator 1100 includes a system of cooperating seals and a leak detection system. As shown in FIG. 15, a tray 1510 for collecting excess fluid is located on the top surface the ball cylinder 1140. The tray 1510 is sized and shaped to direct the excess fluid toward and through a notch 1515 and into a funnel 1520. In this example implementation, the sensor PCB on the track 1182 includes a leak detection sensor element that is disposed along the side of the track 1182 that faces the central axis. The funnel 1520, as shown, is sized and shaped to direct the excess fluid toward the leak detection sensor element on the sensor PCB on the track 1182, which may include electrical probes near the bottom that generate a warning signal when excess fluid is detected. Gravity, surface tension, and the adhesion properties of the fluid operate to direct the flow of fluid along the surface of the leak detection sensor and toward a drain in the bottom of the housing 1190. The leak detection sensor in other implementations is separate from the sensor PCB on the track 1182.

FIG. 18 is a perspective view of the top surface of the ball cylinder 1140 inside the hollow screw shaft 1130. The first limiter 1170a is shown; the second limiter 1170b is omitted in order to facilitate a better view of the tray 1510. The tray 1510, as shown, at least partially surrounds the connecting rod 1115. In this example implementation, the cap 1153 facilitates the locating and retention of the tray 1510. The tray 1510 is shaped to direct the excess fluid toward the notch 1515 and into the sensor support sleeve 1700 as described herein.

Figure 16:
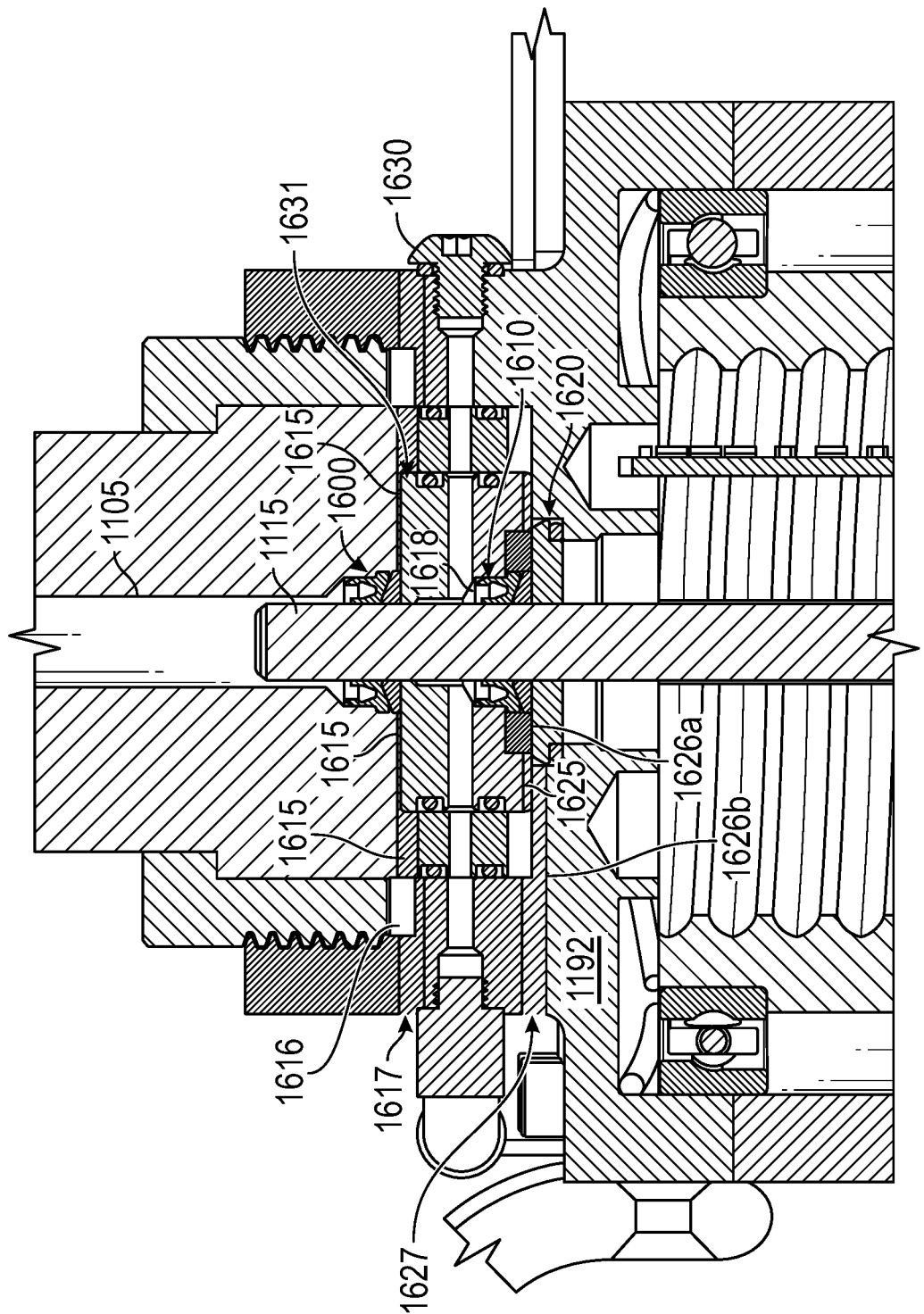
FIG. 16 is a sectional view of the linear actuator of FIG. 11 near the upper end plate.

FIG. 16 is a sectional view of the linear actuator 1100 of FIG. 11 near the upper end plate 1192. The linear actuator 1100 in this example implementation includes three seals: a primary seal 1600, a leak capture seal 1610, and a secondary leak capture seal 1620.

The primary seal 1600, as shown, is located around the connecting rod 1115 where it engages with the cylinder 1105 which contains the working fluid of the example pump system shown in FIG. 11. Two weep holes 1615 are located on the lateral sides of the primary seal 1600 to collect fluid that may leak past the static sealing surface between the primary seal 1600 and the cylinder 1105, and then to direct the fluid away from the connecting rod 1115. The weep holes 1615 are in fluid communication with one or more cavities 1616 and a fluid exit 1617.

A rinsing system 1631 is located between the primary seal 1600 and the leak capture seal 1610. Fluid that may leak past the dynamic sealing surface between the primary seal 1600 and the connecting rod 1115 is collected in the cavity 1618 of the rinsing system 1631. The rinsing system 1631 includes a removable plug 1630, as shown, and provides a way to flush excess fluid and/or clean the surfaces of the connecting rod 1115 and other components. The rinsing fluid may be water or another suitable liquid or gas. During a rinse, the plug 1630 may be removed and replaced with a fitting or other adapter for use when introducing the rinsing fluid.

The leak capture seal 1610, as shown, is similar in structure to the primary seal 1600. Two secondary weep holes 1625 are located on the lateral sides of the leak capture seal 1610 to collect working fluid (and/or rinsing fluid) that may leak past the sealing surfaces between the leak capture seal 1610 and the body of the rinsing system 1631 or connecting rod 1115. The secondary weep holes 1625 are in fluid communication with an annular cavity 1626a, one or more other cavities 1626b, and a secondary fluid exit 1627. These cavities 1626a, 1626b are sized and shaped to direct the fluids toward the fluid exit 1627.

The secondary leak capture seal 1620 is located beneath the leak capture seal 1610, as shown. Fluid that travels past the sealing surfaces of the secondary leak capture seal 1620 may travel downward along the connecting rod 1115 and into the tray 1510 on top of the ball cylinder 1140, as shown in FIG. 18.

FIG. 17D is a perspective view of a sensor support sleeve 1700 suitable for use with the ball cylinder 1140 described herein. The sensor support sleeve 1700 in this example implementation is a modular component, generally cylindrical in shape and suitable for insertion into the ball cylinder 1140 from below during assembly. In other implementations, all the features and elements of the sensor support sleeve 1700 may be included as part of the ball cylinder 1140 itself.

FIG. 17A is an illustration of the top surface 1720 of a sensor support sleeve 1700 suitable for use with the ball cylinder 1140 described herein. The sensor support sleeve 1700 defines a track opening 1158 that is sized and shaped to slidably receive a track 1182, as shown in FIG. 15. The track opening 1158, as shown in FIG. 17A, includes space on the right side to accommodate the magnetic field sensors 1184. On the left side of the track opening 1158, the conical surface acts as the funnel 1520, directing excess fluid toward the leak detection sensor element on the track 1182. The shape of the track opening 1158 throughout the length of the sensor support sleeve 1700 helps maintain the position of the track 1182 and sensors 1184 relative to the magnet 1186.

FIG. 17B is a view of the front side 1730 of the sensor support sleeve 1700. The top rim 1722 and its various features, as shown, together with the sidewall notches 1726, are sized and shaped to conform to mating elements on the ball cylinder 1140. For example, the features along the top rim 1722 facilitate the positioning and alignment of the leak capture tray 1510 on the ball cylinder 1140 with the funnel 1520. When the sensor support sleeve 1700 is fully inserted, the bottom rim 1728 aligns with the bottom surface of the ball cylinder 1140, as shown in FIG. 15.

FIG. 17C is a view of the right side 1740 of the sensor support sleeve 1700. A magnet pocket 1742 is sized and shaped to support the magnet 1186 (shown in FIG. 15). The magnet 1186 in some implementations is permanently affixed inside the magnet pocket 1742. The right side 1740 in this example includes two raised bumps 1744 that are sized and shaped to fit into matching elements on the ball cylinder 1140 when the sensor support sleeve 1700 is fully inserted. As the sensor support sleeve 1700 is inserted, the outer wall and the raised bumps 1744 are gently compressed inward until the sensor support sleeve 1700 is fully inserted, when the bumps 1744 flex outward, snap into place, and thereby fix the sensor support sleeve 1700 in place within the ball cylinder 1140.

Unless expressly stated herein, nothing in this description is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such values are intended to have a reasonable range that is consistent with the functions to which they relate and with what is customary in the art to which they pertain.

In addition, in the foregoing description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A linear actuator comprising:
   a hollow screw shaft supported along a central axis by a support bearing within a housing and having an internal thread;
   a ball cylinder concentrically disposed within said hollow screw shaft and having an external thread that is sized and shaped to oppose said internal thread and therebetween define a substantially continuous working pathway for a plurality of balls of uniform size,
   wherein said ball cylinder defines an internal return path therethrough, such that said internal return path and said working pathway define a substantially continuous ball circulation pathway, and wherein said plurality of balls is sized to fit in a substantially contiguous series when positioned along said ball circulation pathway,
   wherein said linear actuator is oriented vertically along said central axis, such that said ball cylinder is characterized by a top surface, a generally opposing bottom surface, and an outer wall, and wherein said ball cylinder further comprises:
   (a) first bore extending radially from said outer wall toward said central axis, wherein said first bore is sized and shaped to slidably receive a first scoop insert body; and
   (b) a vertical passage substantially extending parallel to said central axis from said first bore to (c) a second bore, wherein said second bore is spaced apart from and substantially parallel to said first bore and extends radially from said outer wall, and wherein said second bore is sized and shaped to slidably receive a second scoop insert body;
   wherein said first scoop insert body comprises a first scoop and defining a first internal passage therethrough, wherein said first scoop is sized and shaped to guide said plurality of balls between a first valley of said external thread along said working pathway and said first internal passage, wherein said first scoop insert body further defines a first portal between said first internal passage and said vertical passage, and wherein said vertical passage is sized and shaped to guide said plurality of balls between said first internal passage and a second internal passage;
   and wherein said second scoop insert body comprises a second scoop and defining said second internal passage therethrough, wherein said second scoop insert body further defines a second portal between said vertical passage and said second internal passage, and wherein said second scoop is sized and shaped to guide said plurality of balls between said second internal passage and a second valley of said external thread along said working pathway;
   one or more limiters passing through said ball cylinder and coupled to said housing, such that said one or more limiters inhibit rotation of said ball cylinder relative to said housing;
   a connecting rod coupled at its proximal end to said ball cylinder and extending along said central axis to a distal end coupled to a load; and
   a motor configured to rotate said hollow screw shaft, thereby driving said plurality of balls along said continuous ball circulation pathway, imparting a linear motion to said ball cylinder and to said connecting rod.

2. The linear actuator of claim 1, wherein said housing comprises a base plate, an opposing end plate, and a sidewall, wherein said connecting rod extends through an opening in said end plate, and
   wherein said hollow screw shaft defines a substantially open chamber along its length from said base plate to said end plate, such that substantially all of said connecting rod retracts through said opening when said ball cylinder is substantially fully retracted toward said base plate.

3. The linear actuator of claim 1, wherein said first internal passage is sized in a first radius of curvature to guide said plurality of balls between said first portal and said vertical passage; and wherein said second internal passage is sized in a second radius of curvature to guide said plurality of balls between said second portal and said vertical passage.

4. The linear actuator of claim 1, wherein said first scoop comprises one or more first contours which together correspond in size and shape to said first valley of said external thread, while maintaining a first clearance between said first scoop and said internal thread of said hollow screw shaft; and wherein said second scoop comprises one or more second contours which together correspond in size and shape to said second valley of said external thread, while maintaining a second clearance between said second scoop and said internal thread of said hollow screw shaft.

5. The linear actuator of claim 1, wherein said vertical passage is formed by drilling a vertical hole from said top surface of said ball cylinder, extending through said first bore, and ending within said second bore.

6. The linear actuator of claim 1, wherein said plurality of balls comprises a quantity of balls each having an identical ball diameter, and wherein said ball diameter and the geometry of said working pathway are correlated to minimize axial lash of said ball cylinder, such that no lash reduction assembly is required.

7. The linear actuator of claim 1, wherein said one or more limiters comprises a first limiter and a second limiter, and wherein said ball cylinder further comprises:

a first opening located along a transverse diameter and at a radial distance away from said central axis and extending through said ball cylinder in a direction substantially parallel to said central axis, wherein said first opening is sized and shaped to slidably receive said first limiter; and a second opening located along said transverse diameter, at said radial distance away, on an opposing side of said central axis relative to said first opening, and extending through said ball cylinder in a direction substantially parallel to said central axis, wherein said second opening is sized and shaped to slidably receive said second limiter.

8. The linear actuator of claim 1, further comprising:

a linear position sensor assembly configured to detect a current position of said ball cylinder relative to said housing.

9. A linear actuator comprising:

a hollow screw shaft supported along a central axis by a support bearing within a housing and having an internal thread;

a ball cylinder concentrically disposed within said hollow screw shaft and having an external thread that is sized and shaped to oppose said internal thread and therebetween define a substantially continuous working pathway for a plurality of balls of uniform size, wherein said ball cylinder defines an internal return path therethrough, such that said internal return path and said working pathway define a substantially continuous ball circulation pathway, and wherein said plurality of balls is sized to fit in a substantially contiguous series when positioned along said ball circulation pathway, wherein said linear actuator is oriented vertically along said central axis, such that said ball cylinder is characterized by a top surface, a generally opposing bottom surface, and an outer wall, and wherein said ball cylinder further comprises:

(a) a first bore extending radially from said outer wall toward said central axis, wherein said first bore is sized and shaped to slidably receive a first scoop insert body; and (b) a vertical passage substantially extending parallel to said central axis from said first bore to (c) a second bore, wherein said second bore is spaced apart from and substantially parallel to said first bore and extends radially from said outer wall, and wherein said second bore is sized and shaped to slidably receive a second scoop insert body, wherein said first scoop insert body comprises a first scoop and defining a first internal passage therethrough, wherein said first scoop is sized and shaped to guide said plurality of balls between a first valley of said external thread along said working pathway and said first internal passage, wherein said first scoop insert body further defines a first portal between said first internal passage and said vertical passage, and wherein said vertical passage is sized and shaped to guide said plurality of balls between said first internal passage and a second internal passage, and wherein said second scoop insert body comprises a second scoop and defining said second internal passage therethrough, wherein said second scoop insert body further defines a second portal between said vertical passage and said second internal passage, and wherein said second scoop is sized and shaped to guide said plurality of balls between said second internal passage and a second valley of said external thread along said working pathway;

one or more limiters passing through said ball cylinder and coupled to said housing, such that said one or more limiters inhibit rotation of said ball cylinder relative to said housing;

a connecting rod coupled at its proximal end to said ball cylinder and extending along said central axis to a distal end coupled to a load; and a motor configured to rotate said hollow screw shaft, thereby driving said plurality of balls along said continuous ball circulation pathway, imparting a linear motion to said ball cylinder and to said connecting rod, wherein said ball cylinder further comprises:

a vertical opening from said top surface of said ball cylinder, extending through said first bore, and ending within said second bore; and a dowel sized and shaped to be slidably received in said vertical opening;

wherein said first scoop insert body further defines a first vertical opening sized and shaped to slidably receive said dowel therethrough; and wherein said second scoop insert body further defines a second vertical opening sized and shaped to slidably receive said dowel at least partially therethrough, such that said dowel facilitates retention of said first and second scoop insert bodies within said first and second bores.

10. A linear actuator comprising:

a hollow screw shaft supported along a central axis by a support bearing within a housing and having an internal thread;

a ball cylinder concentrically disposed within said hollow screw shaft and having an external thread that is sized and shaped to oppose said internal thread and therebetween define a substantially continuous working pathway for a plurality of balls of uniform size, wherein said ball cylinder defines an internal return path therethrough, such that said internal return path and said working pathway define a substantially continuous ball circulation pathway, and wherein said plurality of balls is sized to fit in a substantially contiguous series when positioned along said ball circulation pathway;

one or more limiters passing through said ball cylinder and coupled to said housing, such that said one or more limiters inhibit rotation of said ball cylinder relative to said housing;

a connecting rod coupled at its proximal end to said ball cylinder and extending along said central axis to a distal end coupled to a load;

a motor configured to rotate said hollow screw shaft, thereby driving said plurality of balls along said continuous ball circulation pathway, imparting a linear motion to said ball cylinder and to said connecting rod, wherein said linear motion of said ball cylinder spans a total stroke length; and said linear actuator further comprising:

a plurality of magnetic field sensors spaced apart lengthwise along a track that is oriented parallel to said central axis and supported by said housing at both ends, wherein said plurality of magnetic field sensors are located along said total stroke length, wherein said ball cylinder further comprises:

a sensor chamber configured to support at least one magnet and defining a track opening parallel to said central axis and extending through said ball cylinder, wherein said track opening is sized and shaped to slidably receive said track therethrough.

11. A linear actuator comprising:

a hollow screw shaft supported along a central axis by a support bearing within a housing and having an internal thread;

a ball cylinder concentrically disposed within said hollow screw shaft and having an external thread that is sized and shaped to oppose said internal thread and therebetween define a substantially continuous working pathway for a plurality of balls of uniform size, wherein said ball cylinder defines an internal return path therethrough, such that said internal return path and said working pathway define a substantially continuous ball circulation pathway, and wherein said plurality of balls is sized to fit in a substantially contiguous series when positioned along said ball circulation pathway;

one or more limiters passing through said ball cylinder and coupled to said housing, such that said one or more limiters inhibit rotation of said ball cylinder relative to said housing;

a connecting rod coupled at its proximal end to said ball cylinder and extending along said central axis to a distal end coupled to a load; and a motor configured to rotate said hollow screw shaft, thereby driving said plurality of balls along said continuous ball circulation pathway, imparting a linear motion to said ball cylinder and to said connecting rod, wherein said ball cylinder further comprises:

a tray positioned to collect excess fluid around said proximal end of said connecting rod, wherein said tray is sized and shaped to direct said excess fluid toward and through one or more notches and into a funnel that is sized and shaped to direct said excess fluid toward a leak detection sensor element, wherein said leak detection sensor element is configured to generate a signal when excess fluid is detected.

* * * * *